Dec. 28, 1965  N. J. SMITH  3,225,684
MACHINE FOR TYING BUNDLES
Filed Sept. 2, 1964  18 Sheets-Sheet 1

Inventor
Norman J. Smith
By Dressler, Goldsmith, Clement, Gordon & Ladd
Attorneys Dec. 28, 1965   N. J. SMITH   3,225,684
MACHINE FOR TYING BUNDLES
Filed Sept. 2, 1964   18 Sheets-Sheet 2
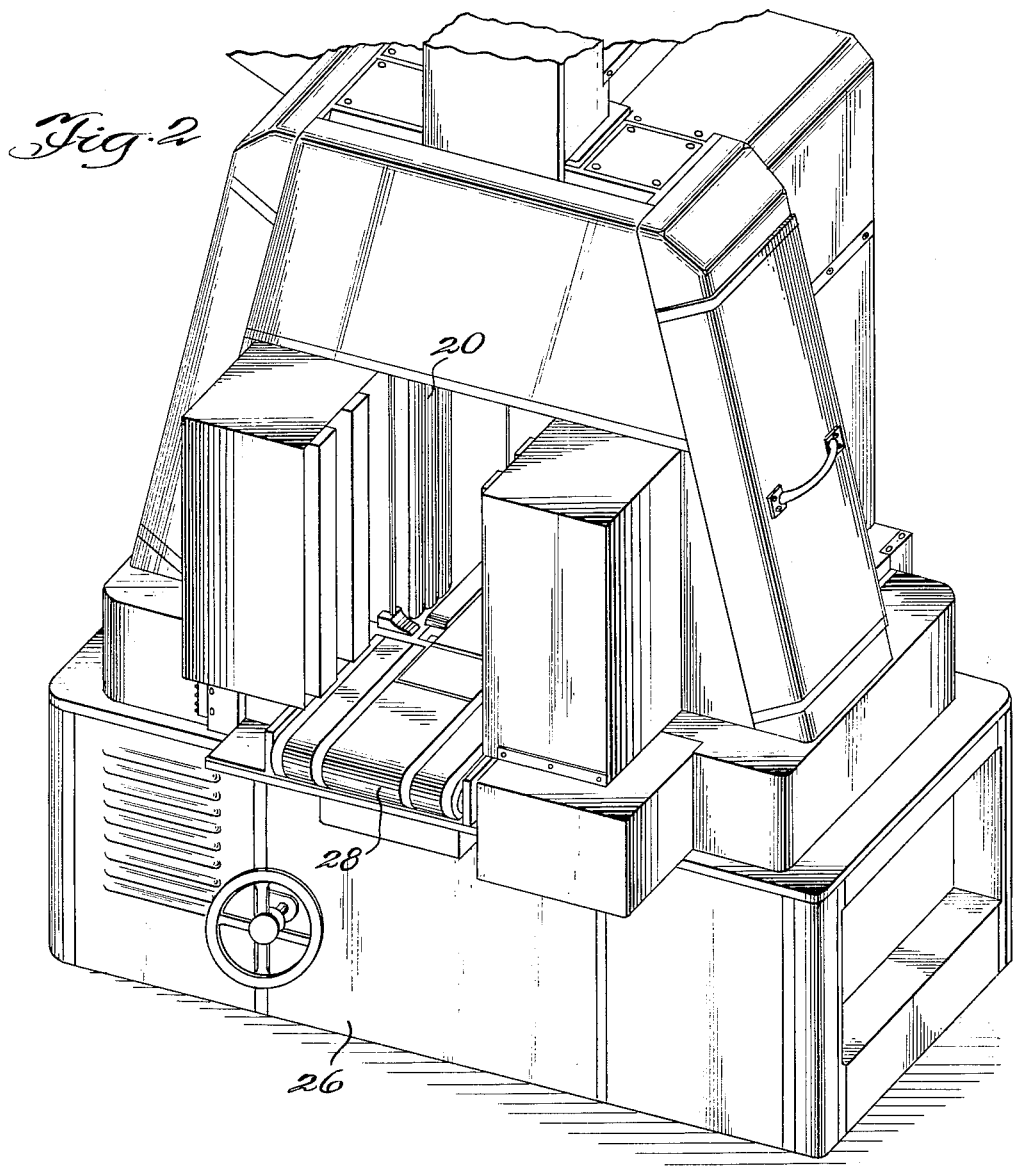
Inventor
Norman J. Smith
By Dressler, Goldsmith, Clement, Gordon & Ladd
Attorneys

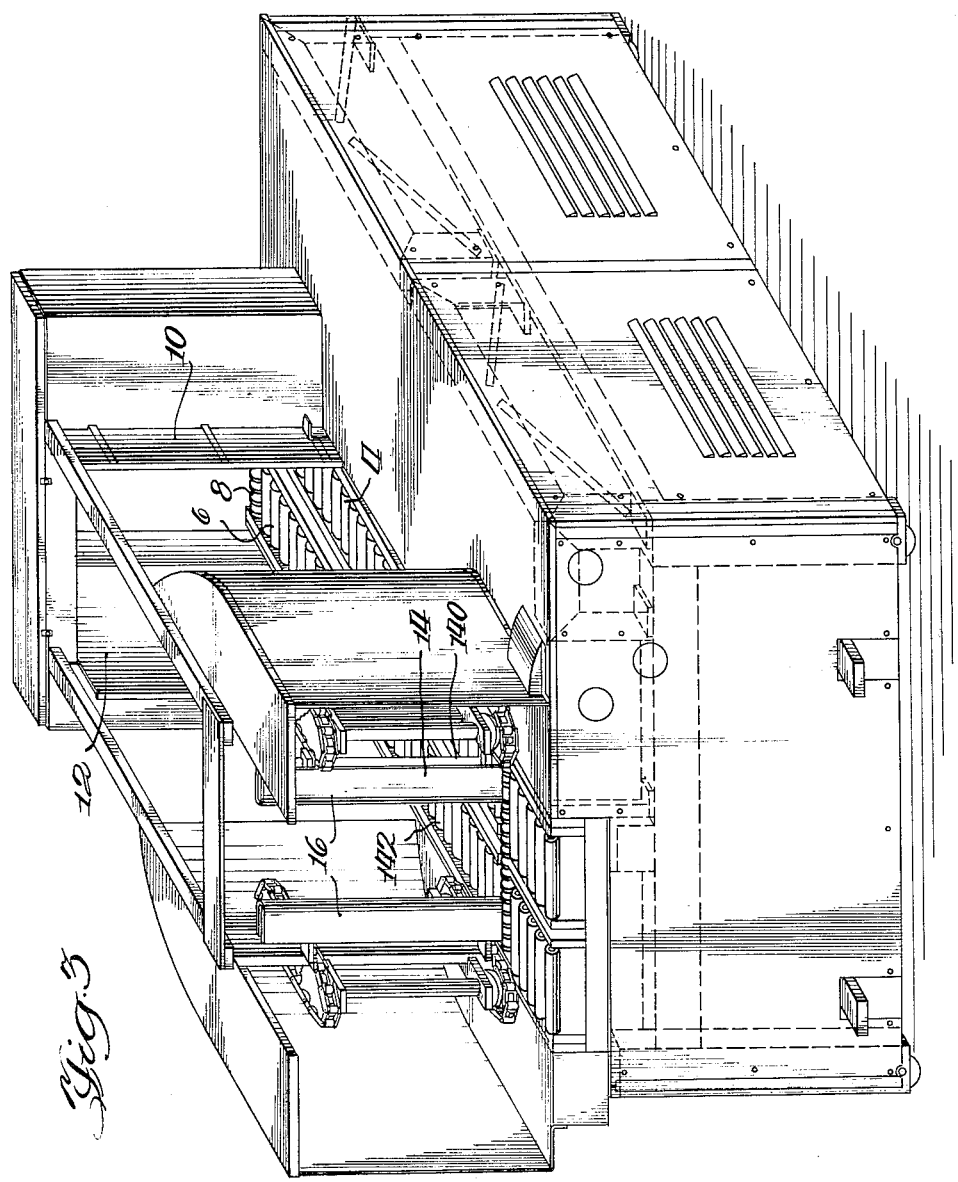

Dec. 28, 1965   N. J. SMITH   3,225,684
MACHINE FOR TYING BUNDLES
Filed Sept. 2, 1964   18 Sheets-Sheet 4
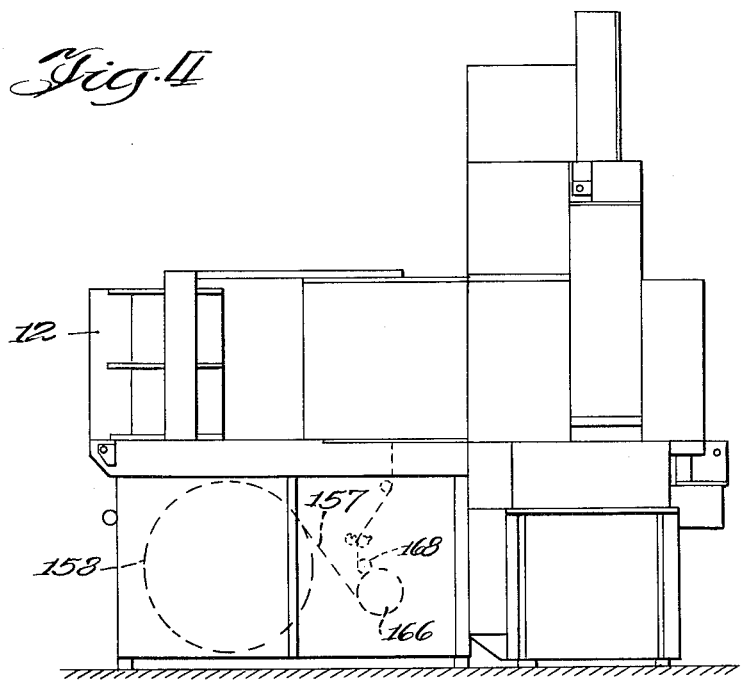
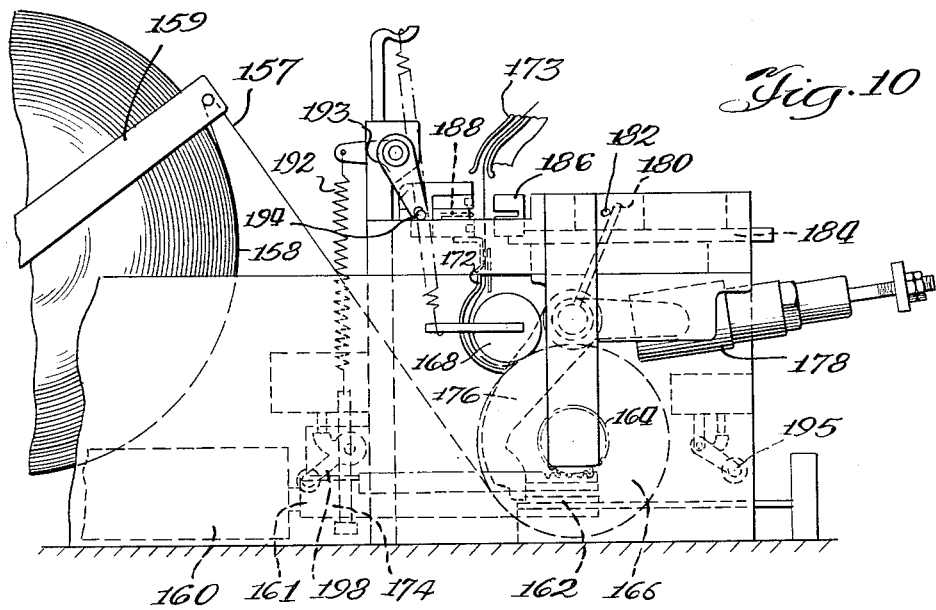

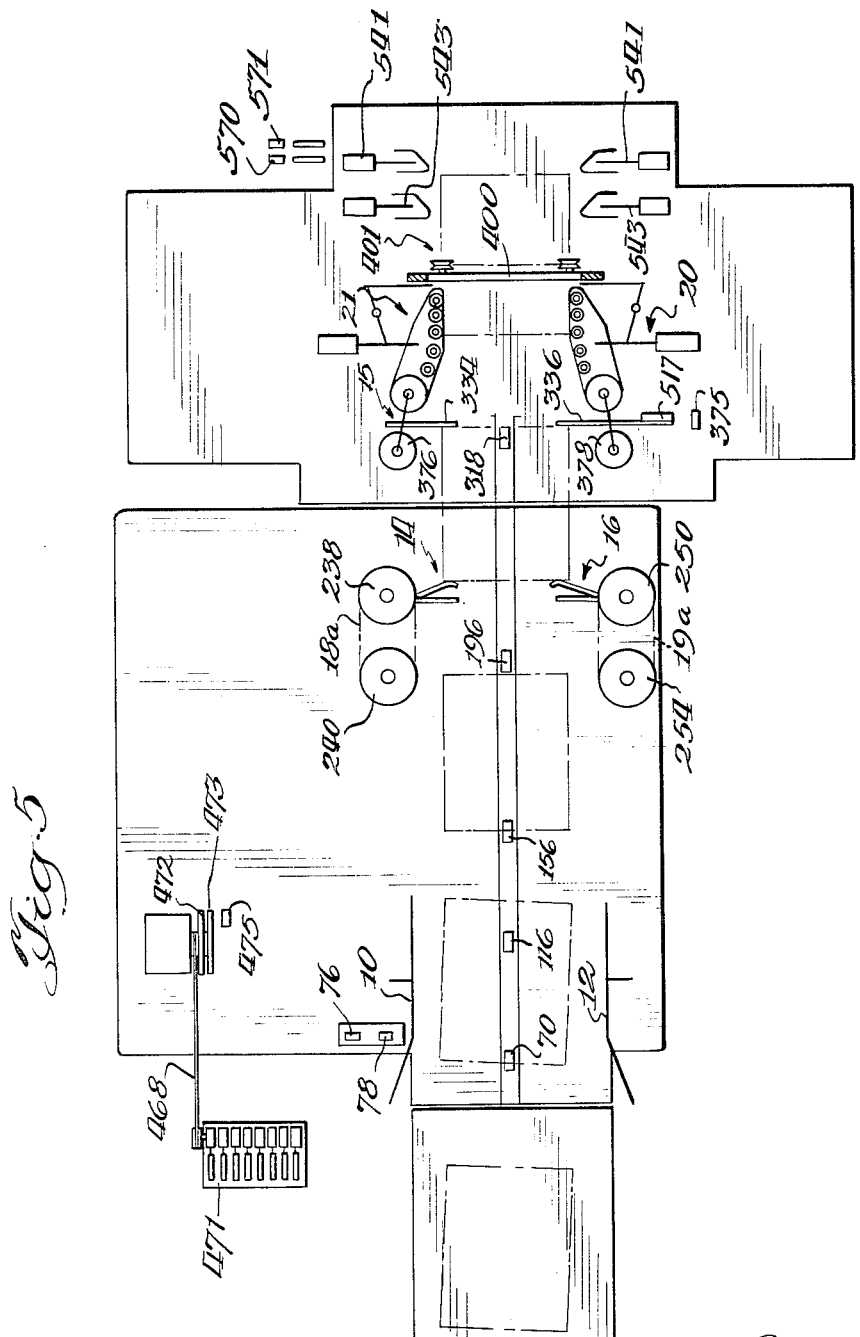

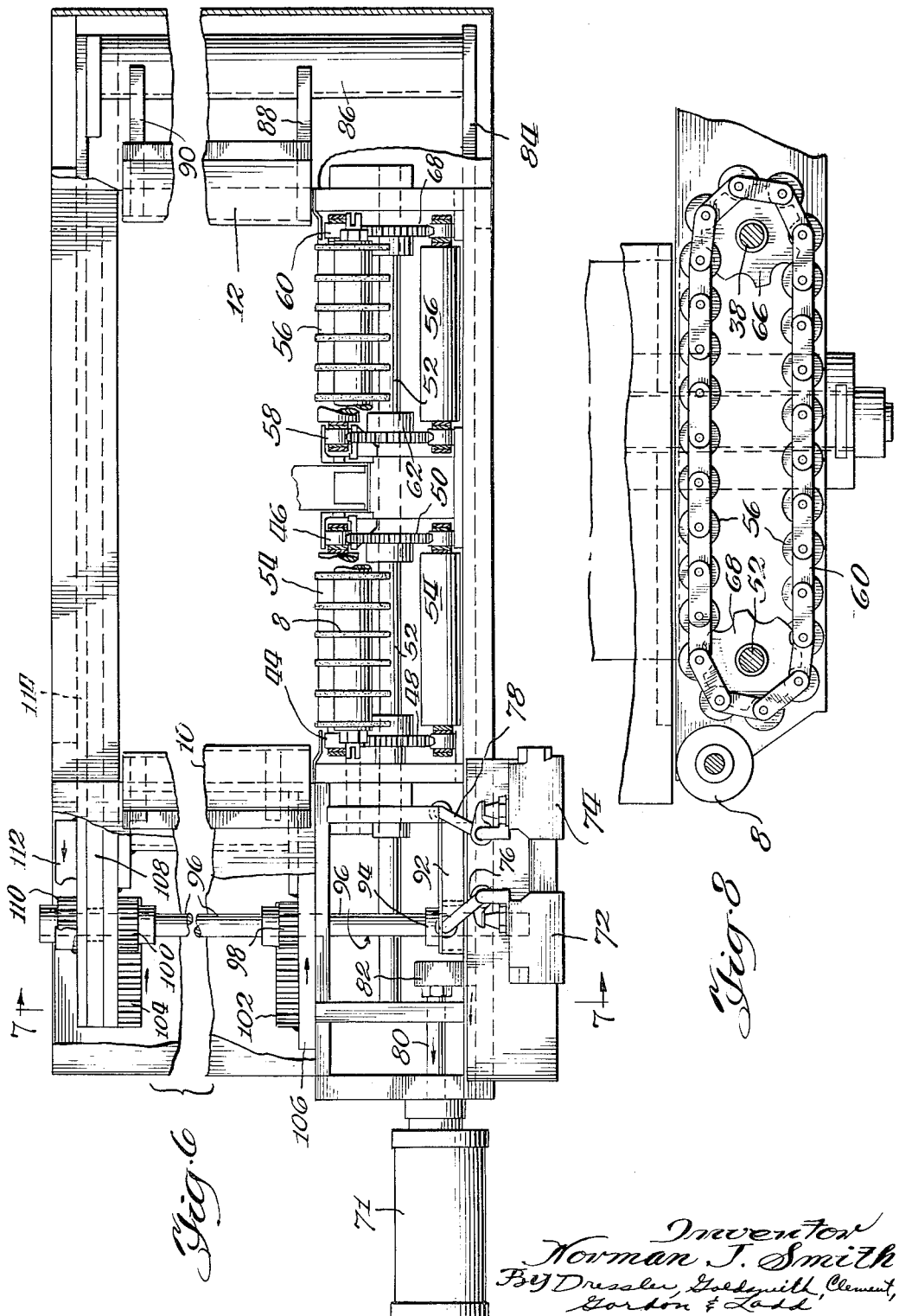

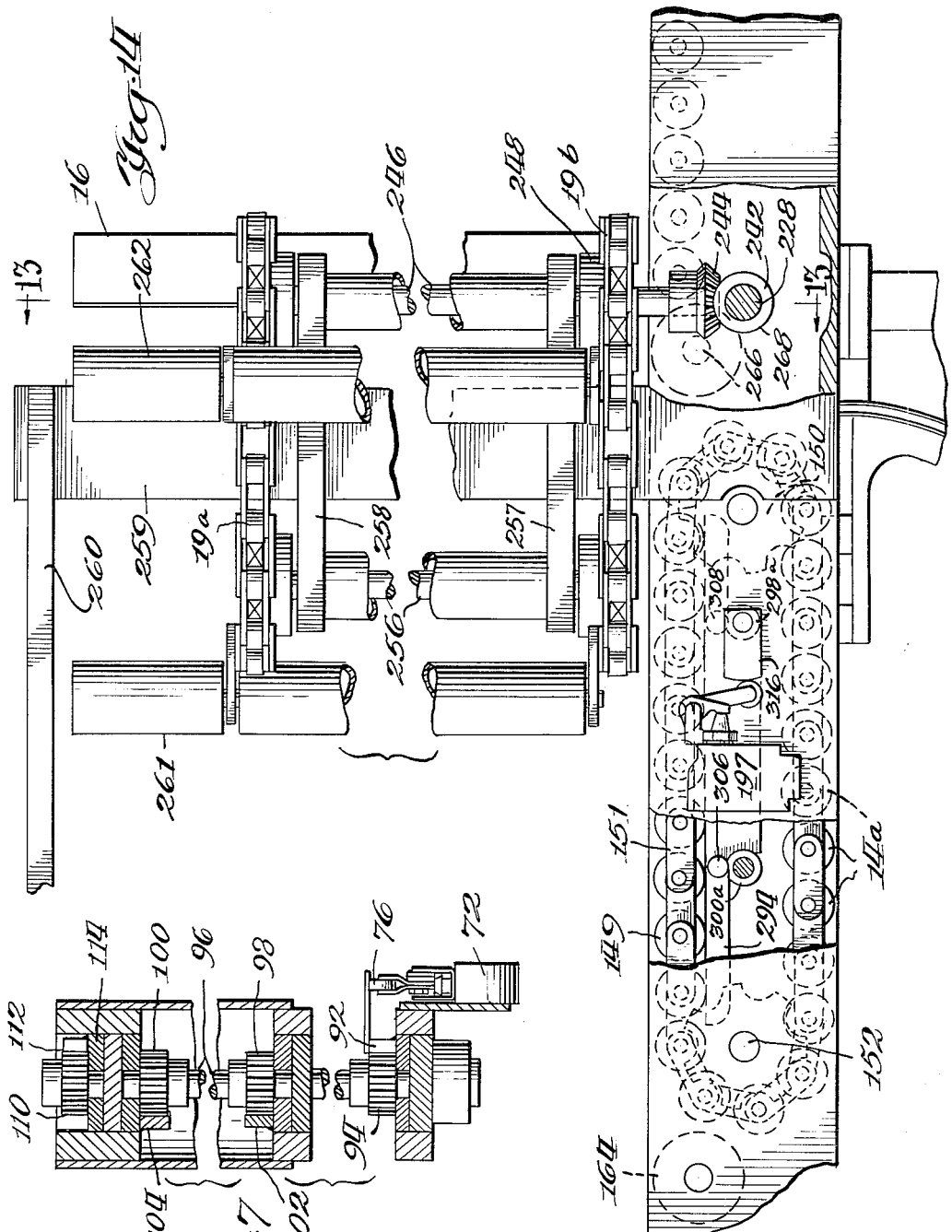

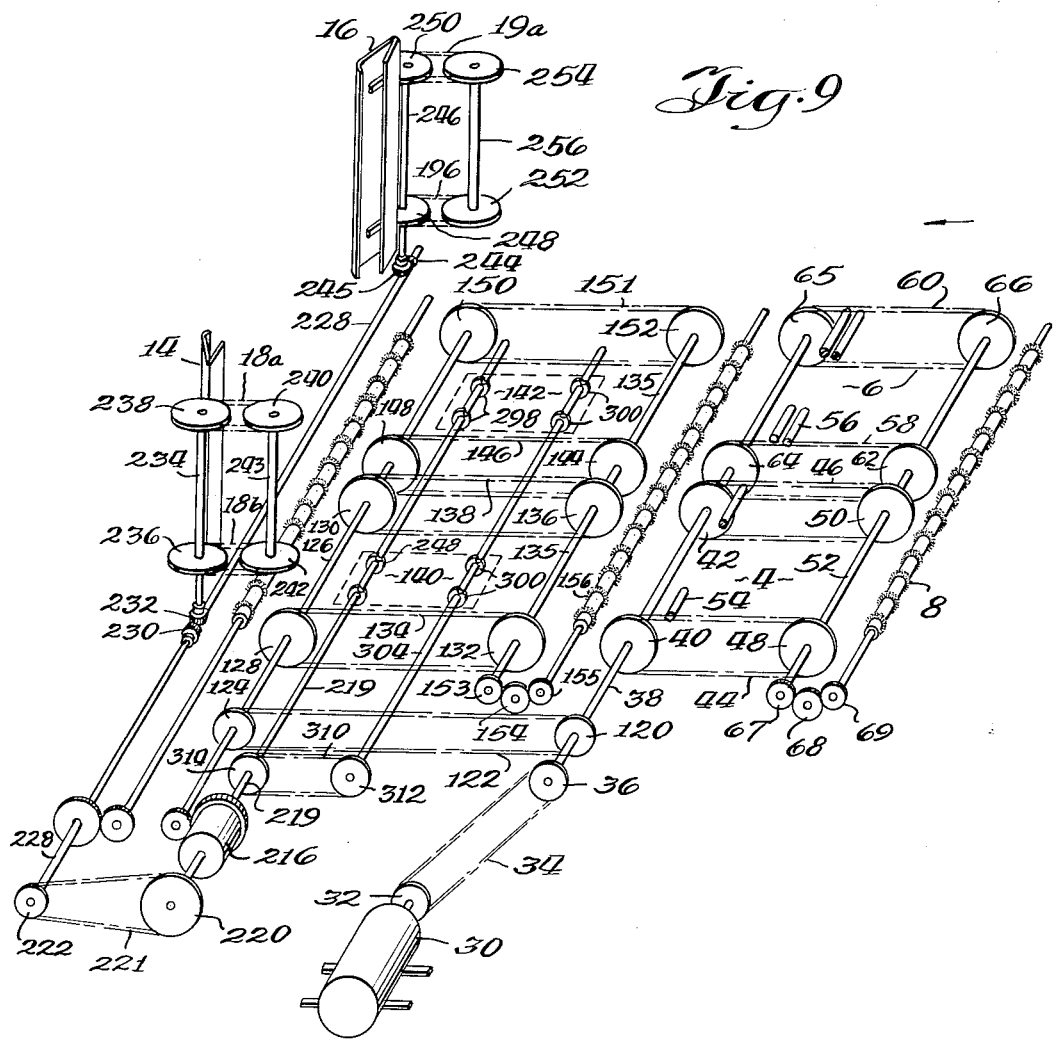

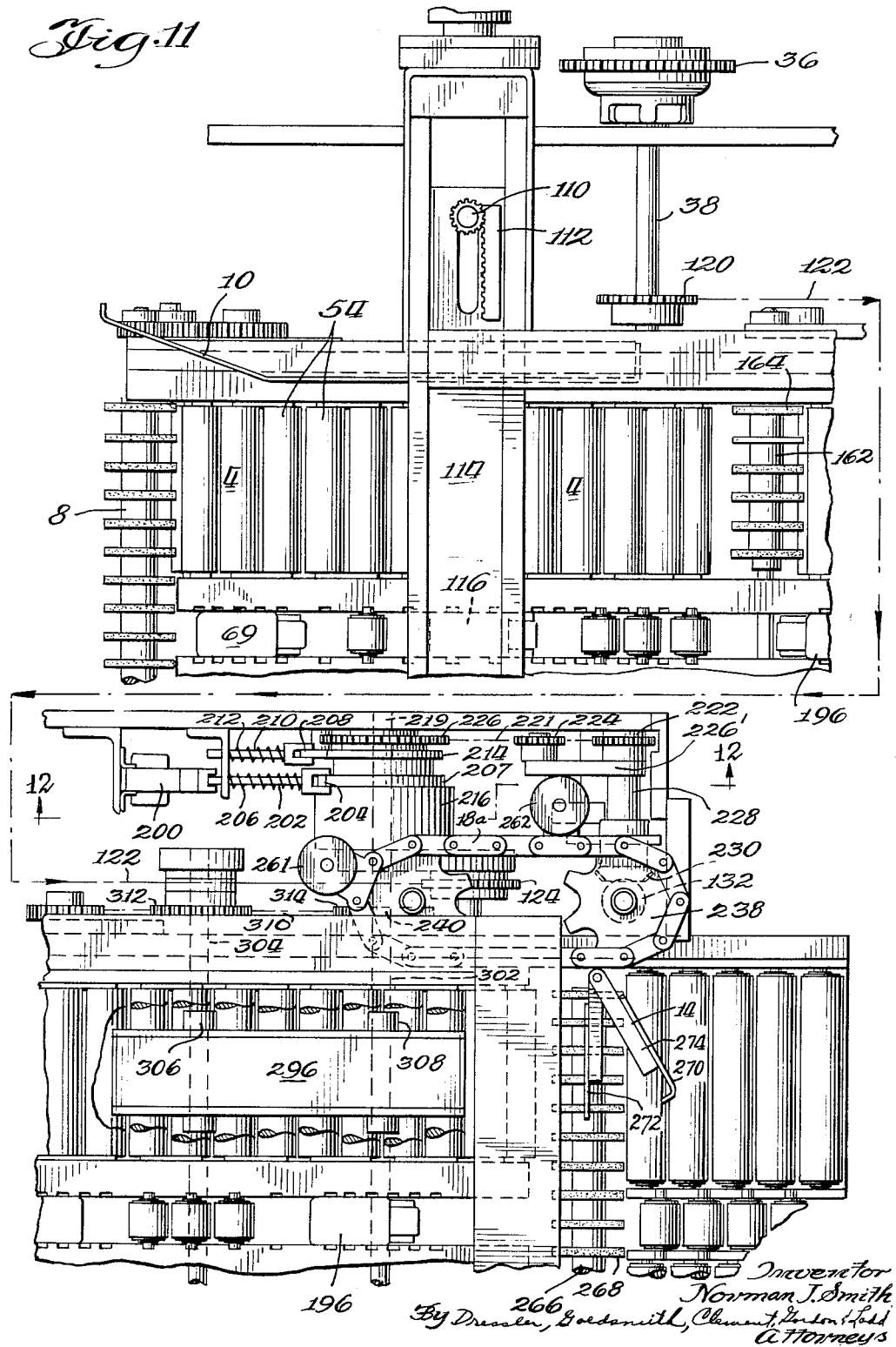

Dec. 28, 1965  N. J. SMITH  3,225,684
MACHINE FOR TYING BUNDLES
Filed Sept. 2, 1964  18 Sheets-Sheet 10
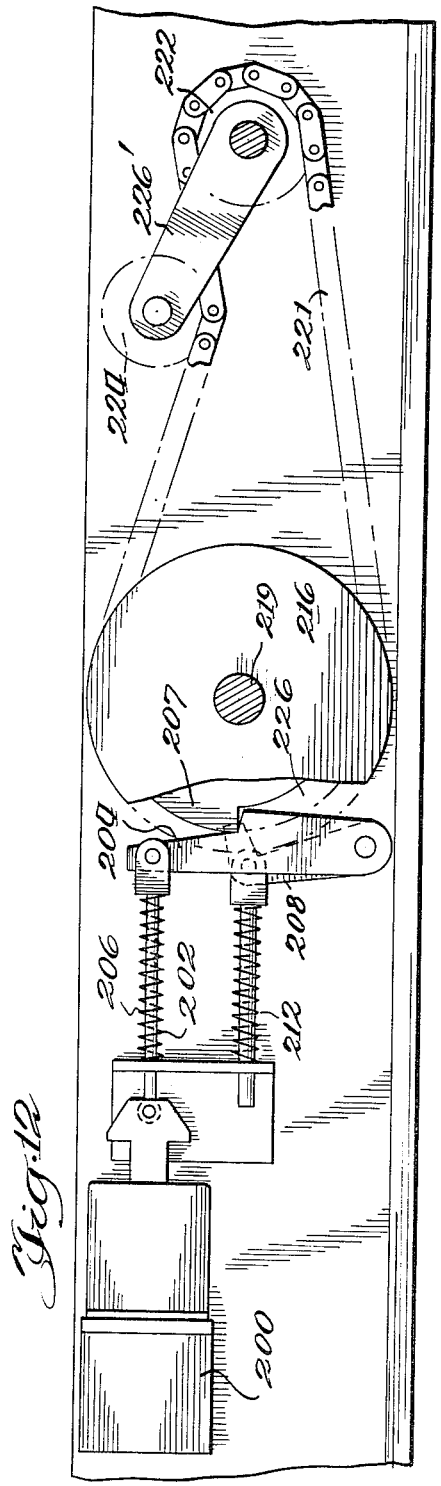
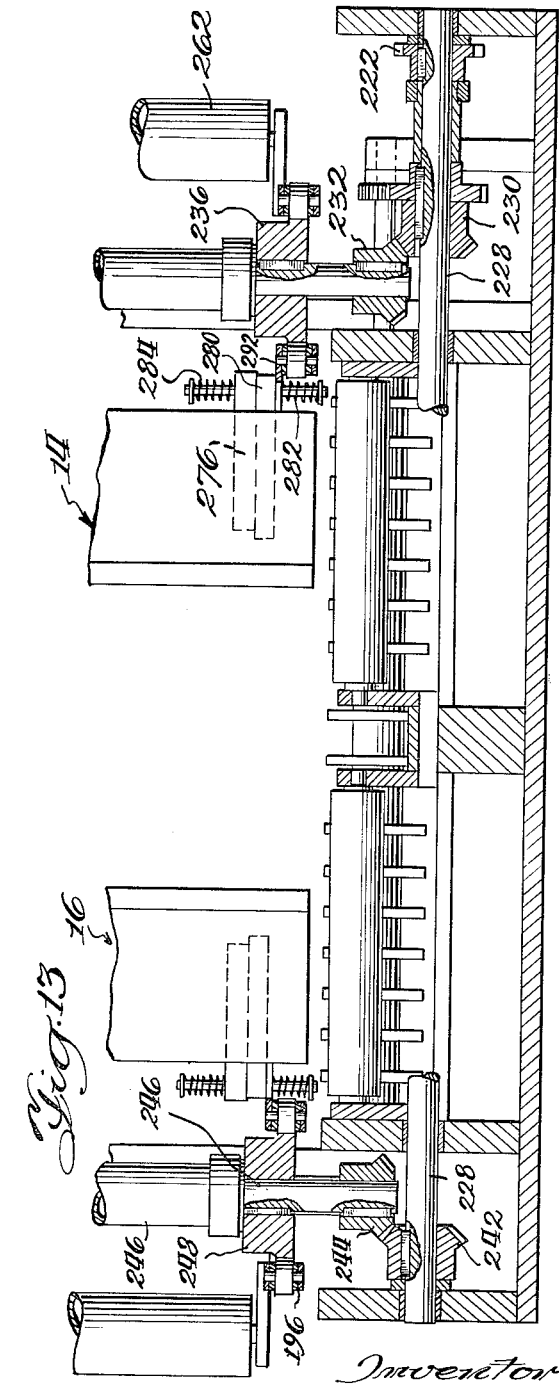
Inventor
Norman J. Smith
By Dressler, Goldsmith, Clement, Gordon & Lodd
Attorneys

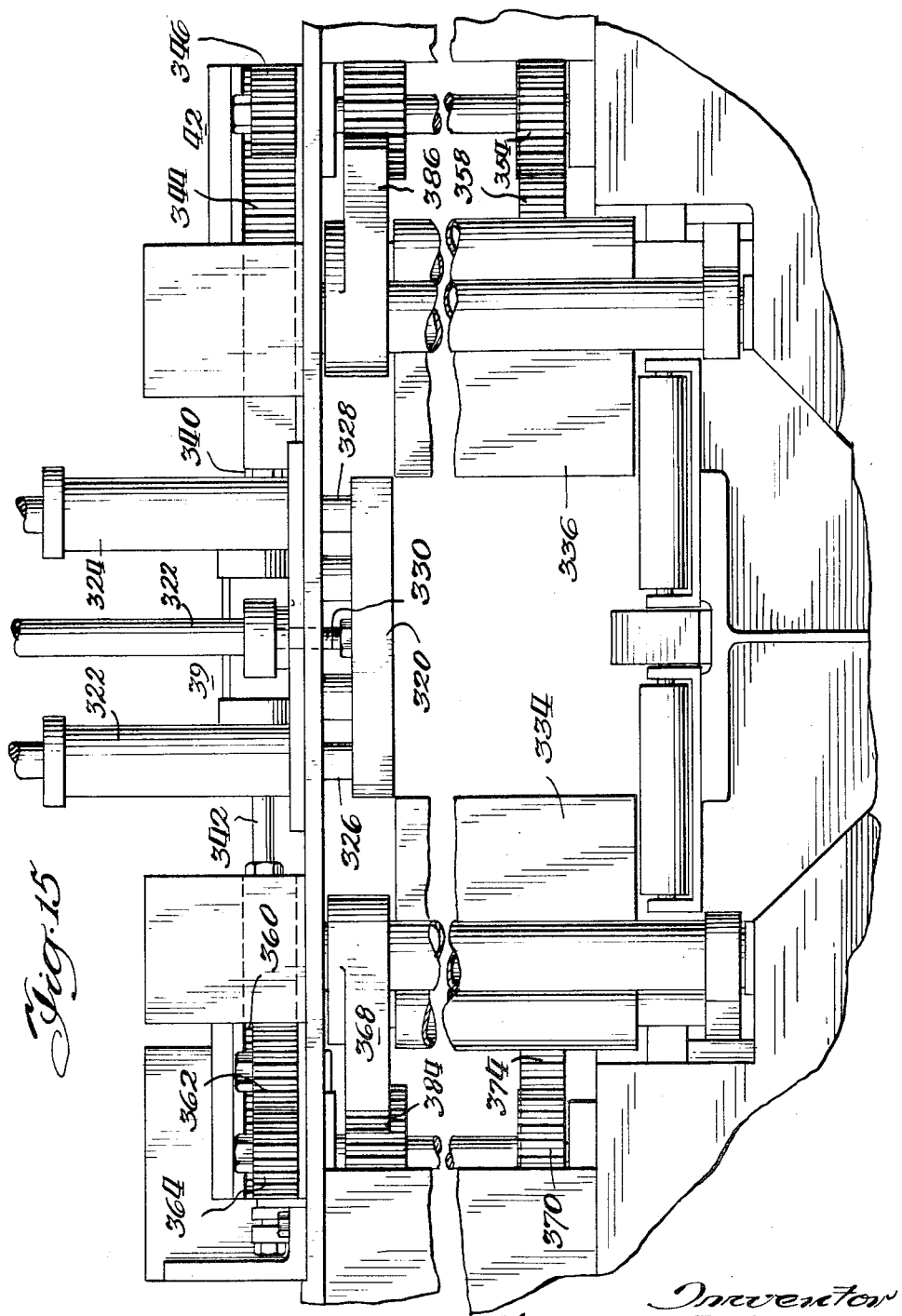

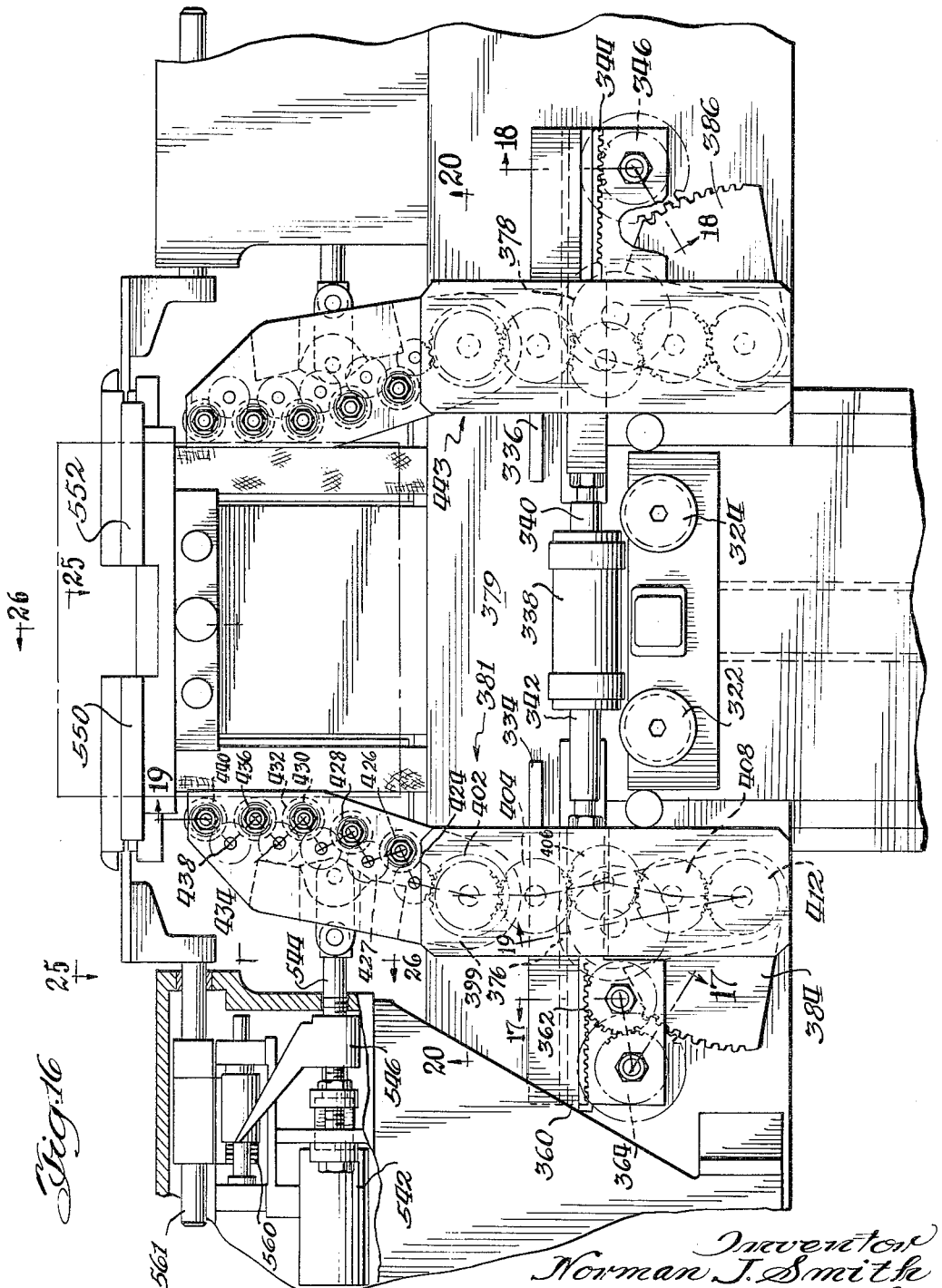

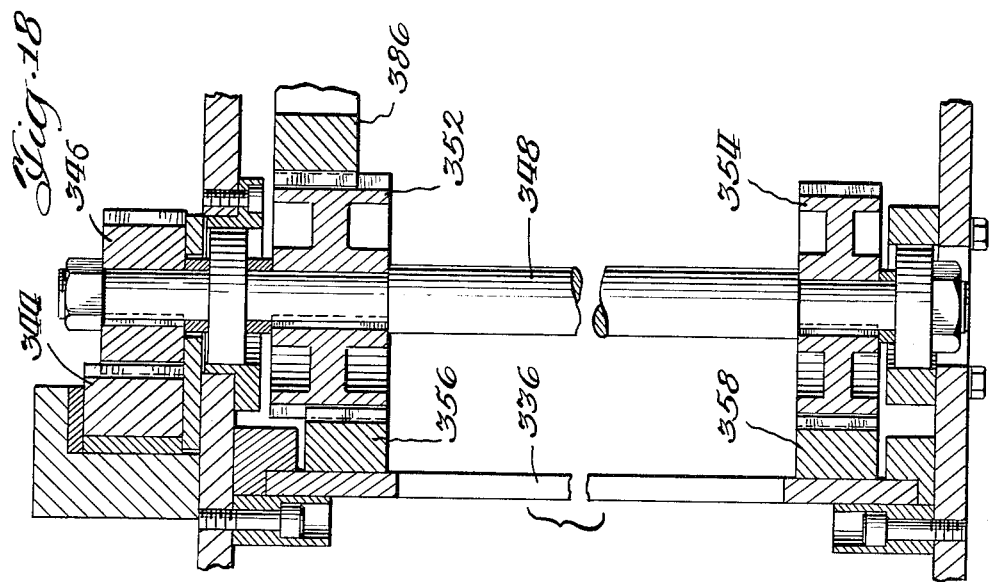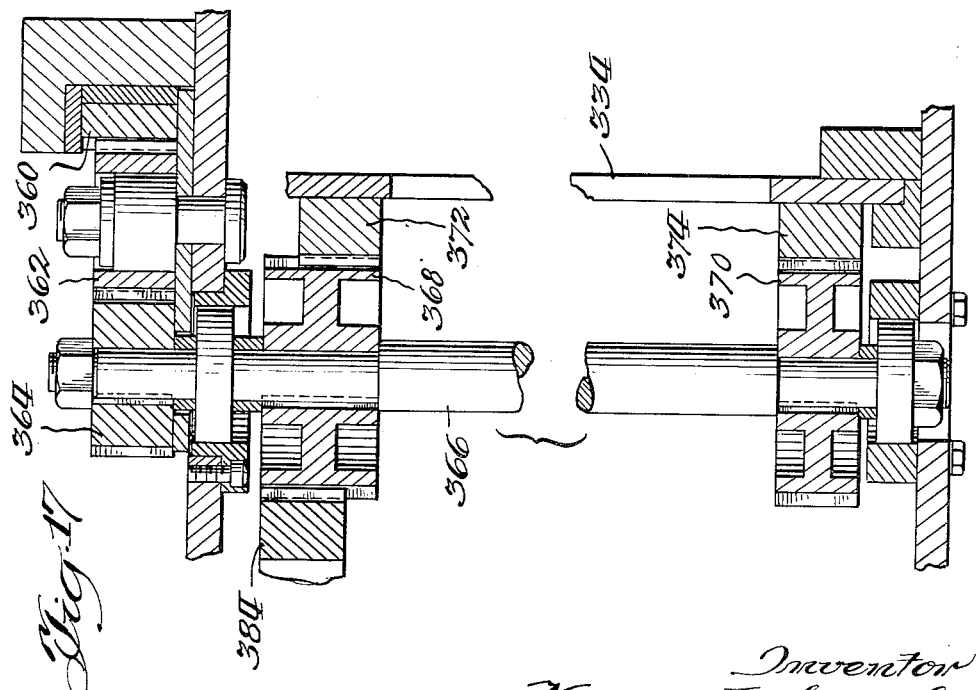

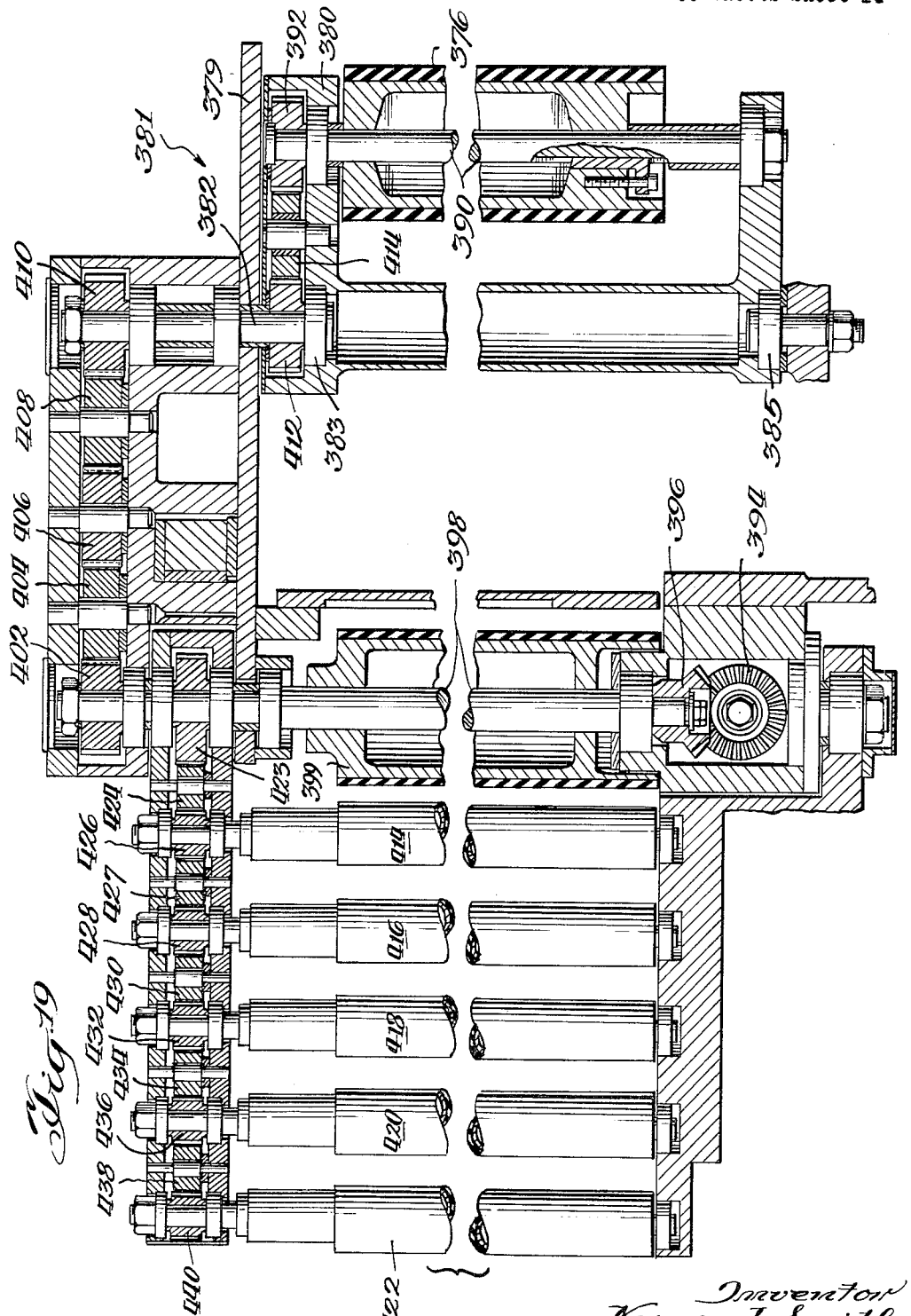

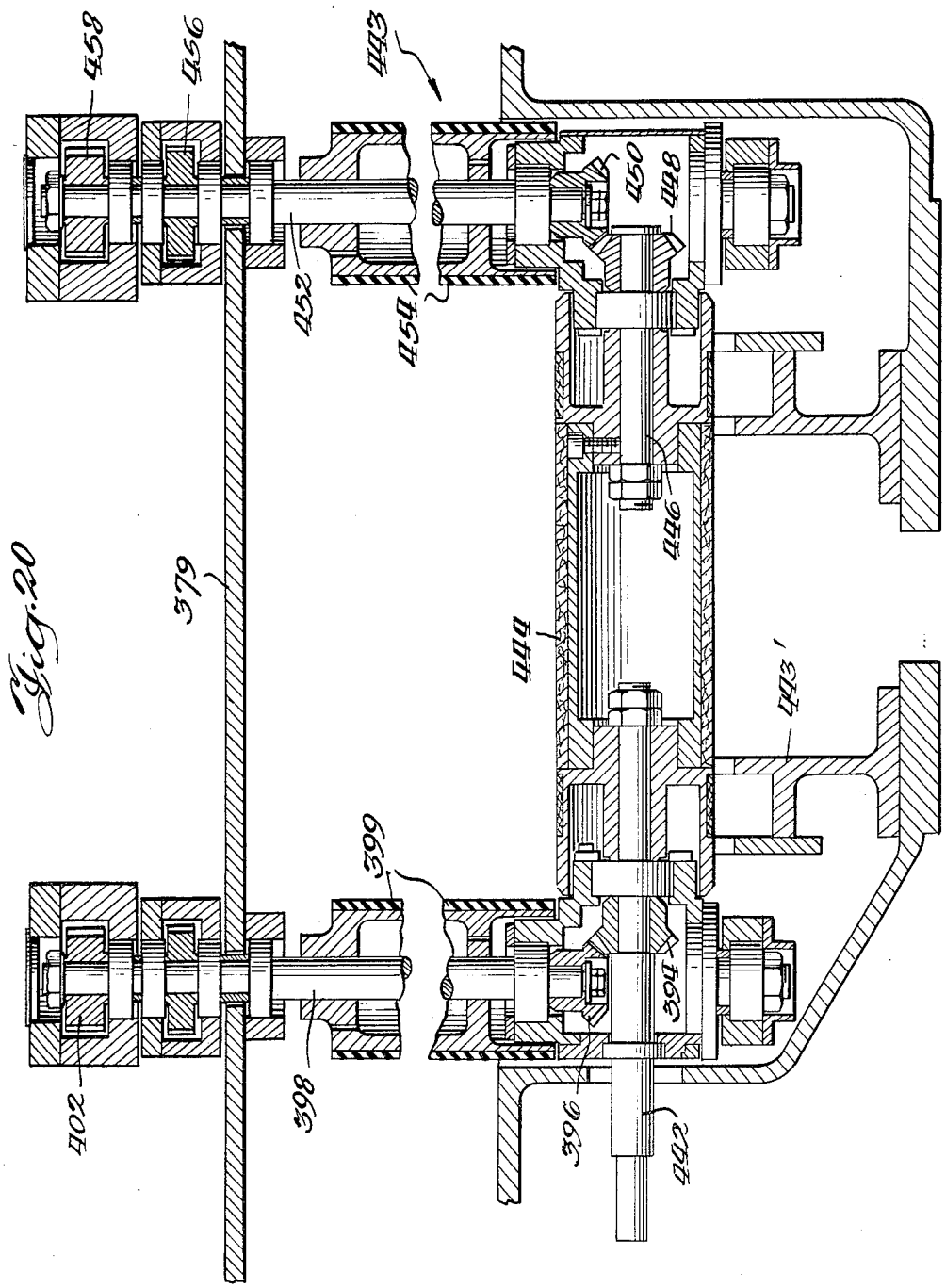

Dec. 28, 1965  N. J. SMITH  3,225,684
MACHINE FOR TYING BUNDLES
Filed Sept. 2, 1964  18 Sheets-Sheet 16
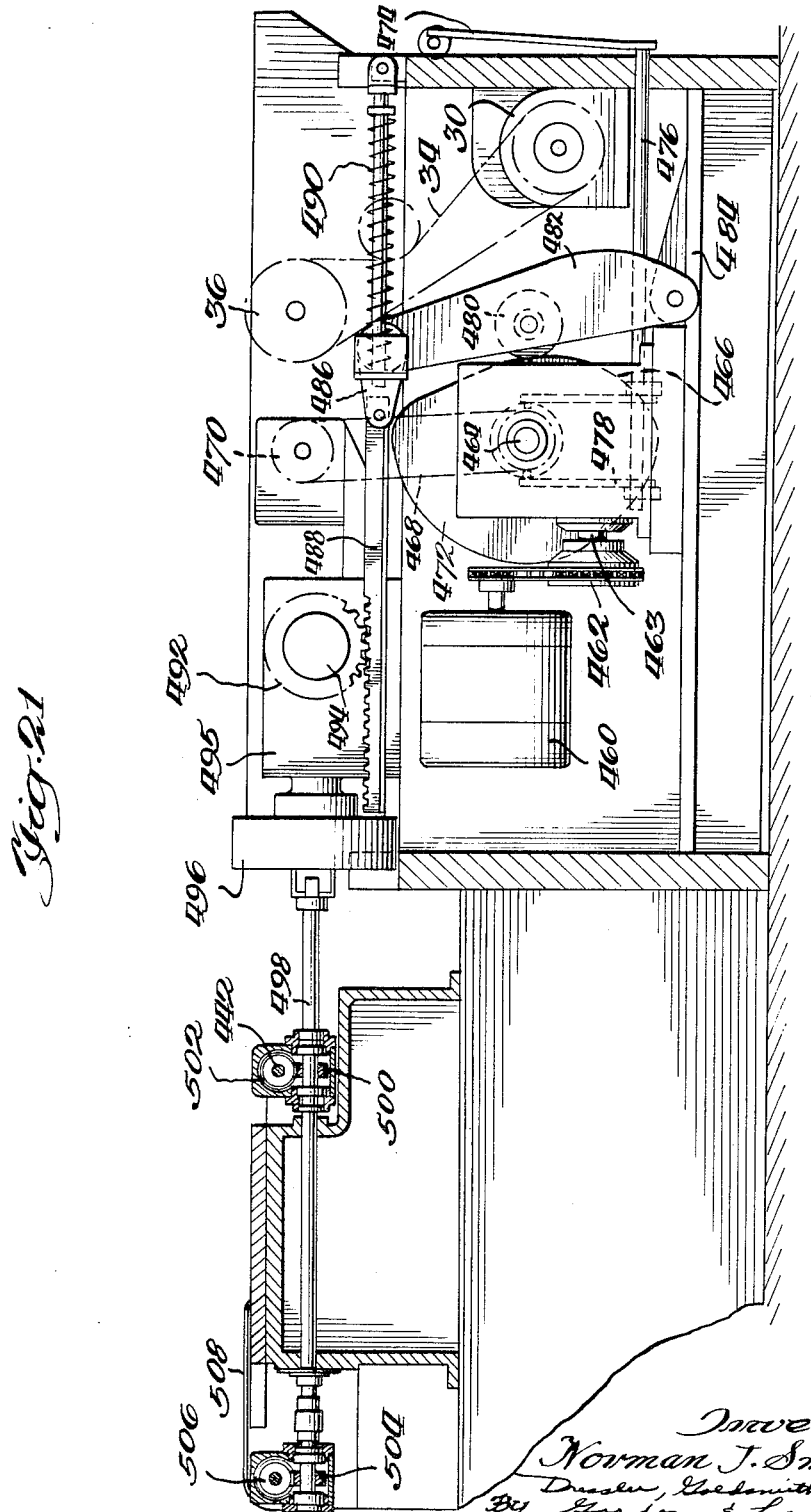
Inventor
Norman J. Smith
By Dressler, Goldsmith, Clement
Gordon & Ladd
Attorneys

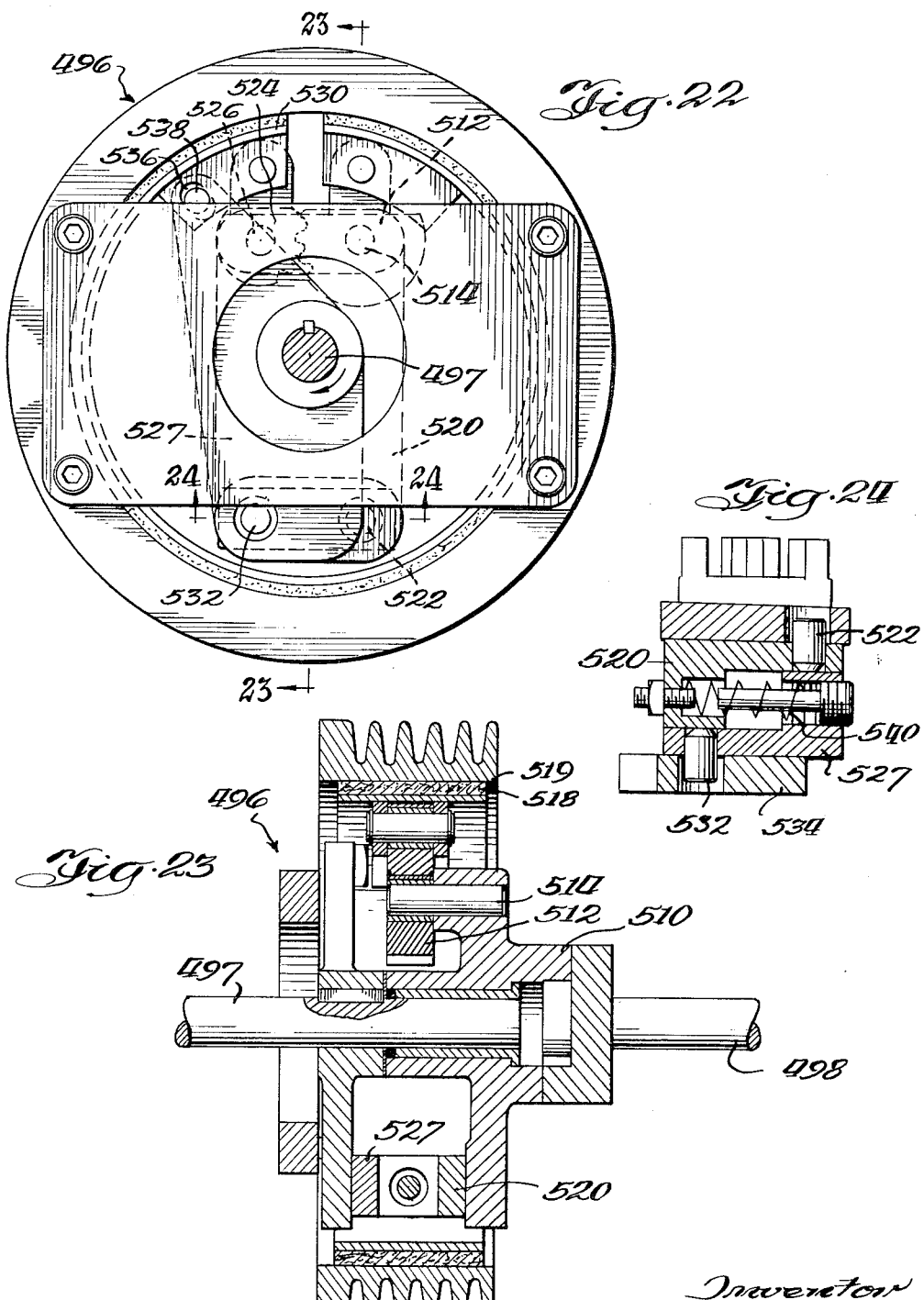

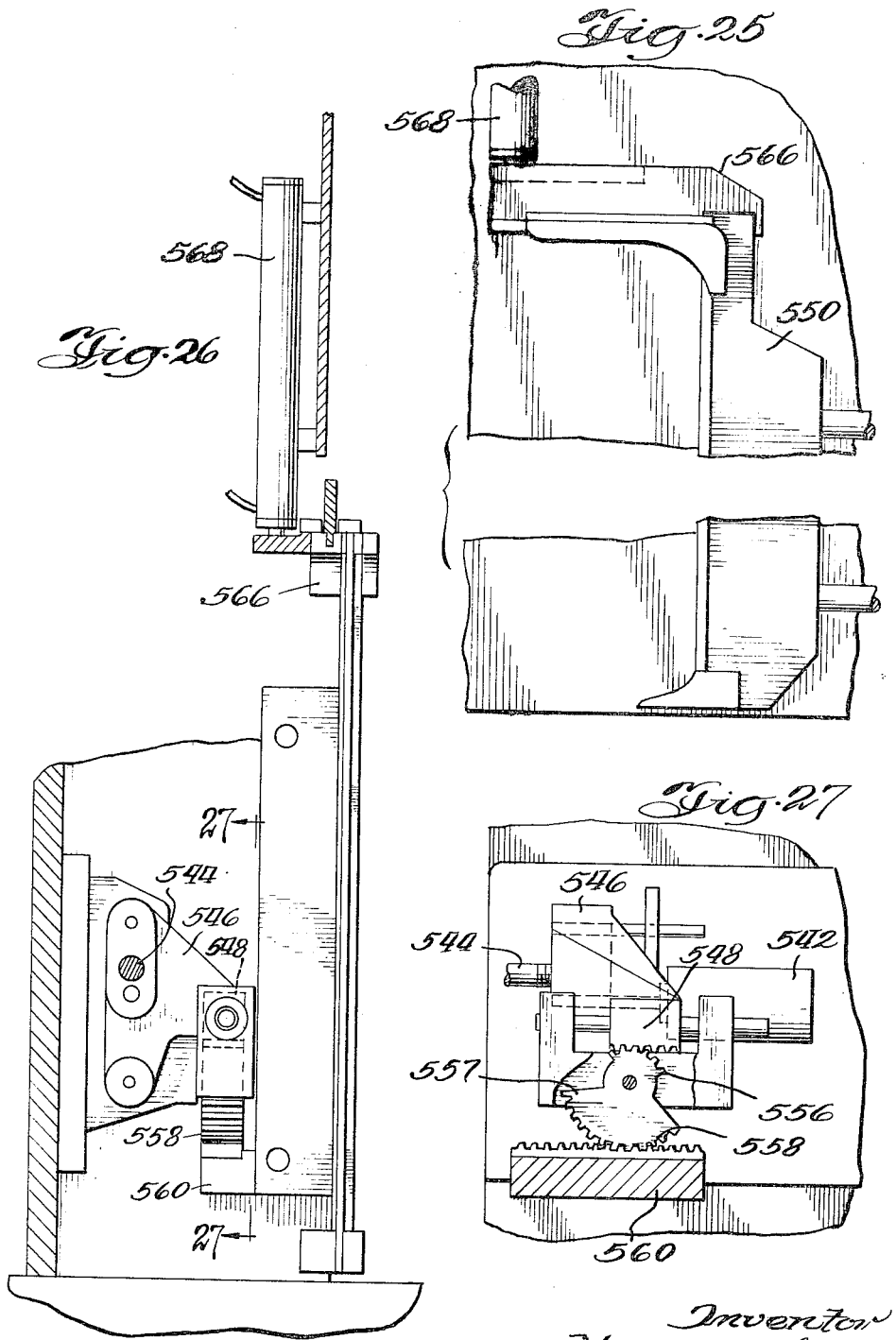

United States Patent Office 3,225,684
Patented Dec. 28, 1965

3,225,684
MACHINE FOR TYING BUNDLES
Norman J. Smith, Benton Harbor, Mich., assignor to Signode Corporation, a corporation of Delaware
Filed Sept. 2, 1964, Ser. No. 393,887
17 Claims. (Cl. 100—4)

This invention relates to a machine capable of taking a prestacked bundle of similar items such as newspapers, magazines, or the like, and shaping them into a consistent bundle. The machine is capable of handling bundles of varying thicknesses, which bundles are subsequently provided with a bottom wrapper, and then securely tied, whereby they can be readily handled during shipping.

The stacking, shaping, and tying of newspapers into bundles has heretofore usually consisted of a combination of manual and semi-automatic machine operations. A typical procedure that is followed consists of taking a stack of newspapers from the printing press, squaring up the stack, providing the bundle with a top and bottom wrapper, and then placing it into a wire tying apparatus, where a wire is wrapped around the bundle and secured in place. Such a course of action involves a number of steps to be performed by the operator, which steps take an appreciable length of time, thus limiting the number of bundles that can be stacked and tied within any given period. In addition, the bundle formed in this manner is subject to the human equation with the result that often times the bundles are not uniform, which results in their taking up added space and increases the likelihood of the bundle coming apart.

In accordance with the present invention, there is provided a machine that will automatically take a bundle of newspapers that are disarranged and through a series of steps will (1) "square up" the bundle along all four sides, (2) provide a bottom wrapper for the stack, (3) compress the bundle, and (4) tie the papers into a tight package. The steps outlined will take place within a very short time, thus enabling the machine to handle a large number of bundles within any given period.

Generally speaking, a stack of papers is first placed in the entry section of the machine, wherein it contacts a switch that controls the operation of a mechanism that squares up the sides of the stack of papers. This is done in a jogging action by a pair of vertically disposed aligner plates located adjacent the sides of the bundle. The plates are oscillated back and forth during the period the bundle is disposed therebetween with the result that the sides of the bundle will be made substantially vertical.

The bundle is then moved by the conveyor into engagement with a control mechanism that starts into motion a bottom wrapper assembly which directs a leading edge of a bottom wrapper immediately in front of the lower portion of the paper stack. The wrapper is cut to size and the forward movement of the bundle moves it into position therebeneath.

Further movement of the bundle brings it into contact with a control mechanism that effects movement of a pair of transversely spaced pusher paddles through the operation of a one-revolution clutch which drives the pusher paddles through a full cycle into engagement with the back of the paper stack to force the papers against a pair of transversely spaced gates. The movement of the bundle by the pusher paddles against the gates lines up the front and rear ends of the papers in the stack to thus completely "square up" the stack of papers. It is to be noted, that when the bundle engages the control for the pusher paddles, a brake assembly is actuated to increase the speed of the conveyor section on which the bundle is located to move the bundle with an increased speed against the aforementioned gates. This moves the bundle out of the way of a succeeding bundle and increases the effectiveness of the squaring action imposed by the pusher paddles and gates.

When the bundle engages the gates, a switch is actuated which functions to move a vertically dipsosed cylinder that is connected at its lower end to a compressor plate that engages the top leading end of the bundle to expel the air from between the adjacent papers and thus reduce the size of the stack and insure that a tighter bundle will be formed. After this occurs, the gates are opened to allow the bundle to be moved toward a wire tying station, where a wire is wrapped around the bundle to secure the papers in place.

The movement of the papers between the gates and the wire tying station is controlled by the movement of longitudinally disposed feeder and bundle positioning rollers located adjacent to and adapted to contact the sides of the bundle. Briefly, a pair of transversely spaced feeder rollers are moved into engagement with the sides of the bundle through a mechanical interlocking arrangement between the gates and the rollers when the gates are opened to move the bundle in a longitudinal direction. Further opening movement of the gates brings one of the gates into contact with a switch which starts a feeder motor that sets into motion a series of operations that take place in a selected sequence to move the bundle a predetermined distance to effect proper positioning of the bundle within a wire tier that is automatically operated to complete the bundle forming operation. The instant machine is designed to move the bundle so that it is tied with a single strand of wire or the machine can be set to sequentially position the bundle so that it can be "double tied."

To effect this mode of operation, the movement of the feeder and bundle positioning rollers is controlled by a motor through a series of suitable cams and gears. The motor is operated to drive the rollers and thus the bundle a predetermined amount, after which the rollers are then stopped and the bundle retained in a position where it is to be tied by a servo brake that stops the rollers to prevent overtravel of the bundle. After the bundle has reached the station where it is to be tied, a pair of cylinders are operated to move the bundle positioning rollers out of contact with the sides of the bundle and at the same time move bundle side clamps against the bundle to hold it in position during the tying operation. When the tying is completed, the clamps are withdrawn and the bundle is moved onto a conveyor and deposited for loading into a truck or other conveyance. If the bundle is to be tied with two strands of wire, the wire tier is actuated and the feeder motor, through a cam, operates the rollers to sequentially move the bundle to the proper position.

The structure by which the above and other advantages of this invention are attained will be described in the following specification taken in conjunction with the accompanying drawings illustrating a preferred structural embodiment of the invention, in which:

FIGURE 2 is a perspective view of the discharge section of the machine;

FIGURE 3 is a perspective view of the entry section from the exit end thereof;

FIGURE 4 is a side elevation view of the complete machine showing the relative position of the bottom wrapper assembly;

FIGURE 5 is a schematic plan view of the machine;

FIGURE 6 is a front elevation, partially in section, showing the entrance conveyor and the jogging mechanism for aligning the sides of the bundle;

FIGURE 7 is a sectional view taken along lines 7—7 of FIGURE 6 showing some of the drive mechanisms for jogging the aligner plates;

Figure 1:
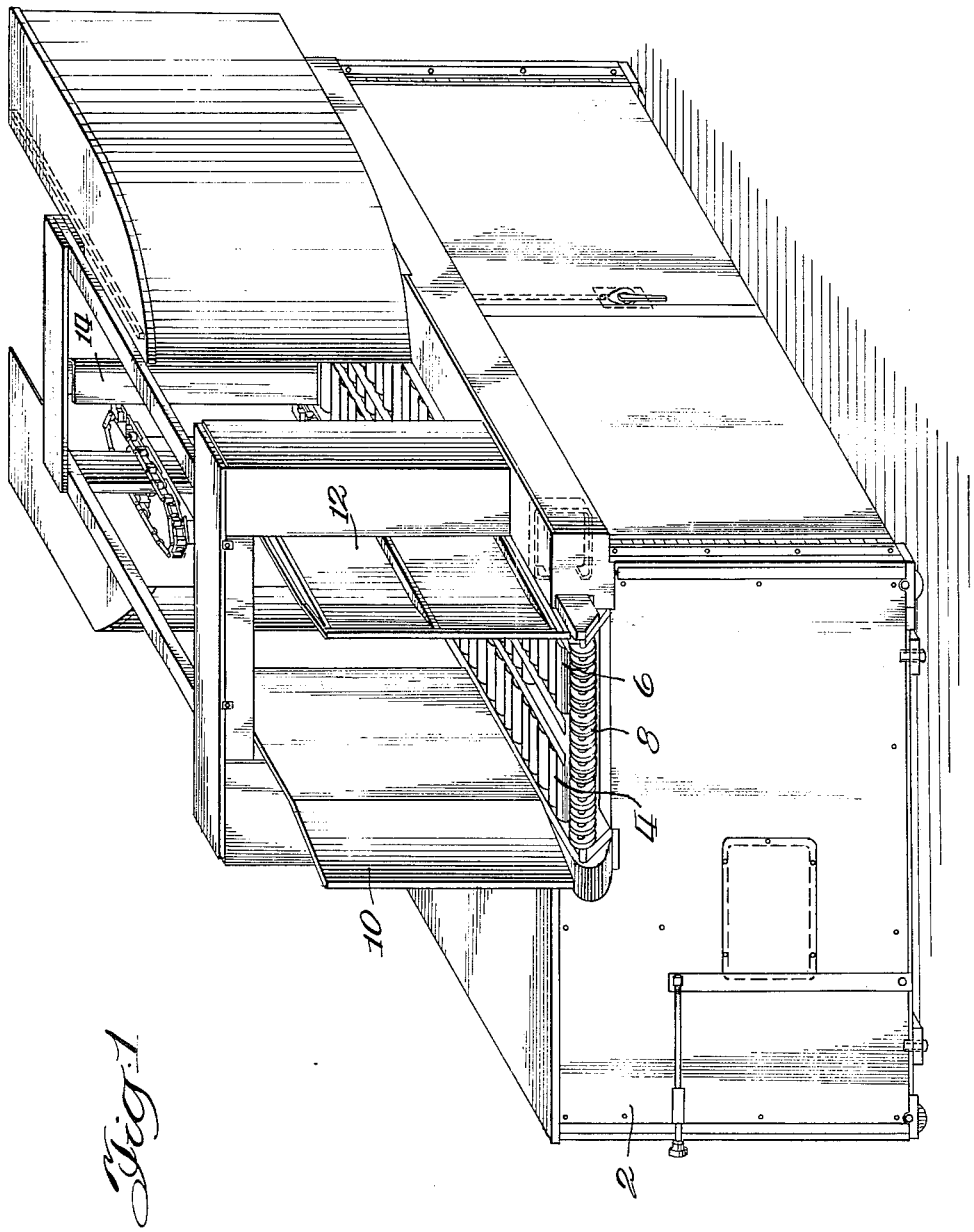
FIGURE 1 is a perspective view of the entry section of the machine.

FIGURE 8 is a side elevation showing the drive for the entrance conveyor;

FIGURE 9 is a schematic view, in perspective, illustrating the various drive mechanisms for the entry conveyor sections and the pusher paddles;

FIGURE 10 is a side elevation showing some of the details of the bottom wrapper assembly;

FIGURE 11 is a plan view, partially broken away, showing approximately one half of the entry and intermediate conveyor sections including some of the drive mechanisms therefor;

FIGURE 12 is a view, partially broken away, taken along lines 12—12 of FIGURE 11;

FIGURE 13 is a lower transverse view taken along lines 13—13 of FIGURE 14 and showing the drive mechanisms for the pusher paddles;

FIGURE 14 is a side elevation showing the support structure for the pusher plates and the mechanism for driving the intermediate conveyor section including the brake assembly for momentarily increasing the speed of the intermediate conveyor section;

FIGURE 15 is a front elevation showing the mechanism for controlling the movement of the compressor plate and gates against which the bundle is biased to square the front and rear ends thereof;

FIGURE 16 is a plan view showing the mechanism for controlling the operation of the gates, the bundle positioning rollers and the bundle clamp;

FIGURE 17 is a sectional view taken along the lines 17—17 of FIGURE 16 showing the mechanical interrelationship between the gate and bundle positioning rollers on the left-hand side of the adjacent conveyor;

FIGURE 18 is a sectional view taken along lines 18—18 of FIGURE 16, which view illustrates the interrelationship between the bundle positioning rollers and the right-hand gate;

FIGURE 19 is a view taken along lines 19—19 of FIGURE 16 showing the bundle positioning rollers;

FIGURE 20 is a sectional view taken along lines 20—20 of FIGURE 16 showing the drive for the bundle positioning rollers located on opposite sides of the conveyor;

FIGURE 21 is a side elevation showing the mechanism for controlling the movement of the bundle positioning rollers and the exit conveyor;

FIGURE 22 is an end view of the servo brake;

FIGURE 23 is a sectional view taken along lines 23—23 of FIGURE 22;

FIGURE 24 is a view taken along lines 24—24 of FIGURE 22;

FIGURE 25 is an elevational view along lines 25—25 of FIGURE 16 showing the bundle side clamps;

FIGURE 26 is a view taken along lines 26—26 of FIGURE 16;

FIGURE 27 is a view taken along lines 27—27 of FIGURE 26; and

FIGURE 28 is a perspective view of a "double tied" bundle.

Referring first to FIGURES 1, 2 and 3, there are illustrated, in perspective, the entry and discharge sections of the machine.

Before going into the details of the machine, the following general review of the major structural components is briefly presented to provide proper orientation for the specifics of the machine.

A stack or bundle of newspapers B (FIGURE 28), covered by a top wrapper, is initially placed in the entry section by an operator who has counted out the proper number of papers to be contained in the bundle. The stack of papers having just been received from the press has probably been prestacked by the employee in charge of making up the bundles.

The entry section of the machine functions to align the sides of the bundle and provides the bundle with a bottom wrapper. After this is accomplished, the bundle is moved to the discharge section of the machine, where the end portions of the bundle are squared up and the bundle is tied and ejected.

The entry section illustrated in FIGURE 1 includes a housing 2 in which the drive mechanisms for a number of the components of the machine are located.

The stack of papers is first placed on a pair of transversely spaced conveyor sections 4, 6 that are positively driven to move the bundle placed thereon longitudinally of the machine. The leading edge of the bottom paper of the bundle is prevented from moving beneath the conveyor sections by a positively driven, axially spaced, row of brushes 8.

The bundle placed on the conveyor sections 4, 6 actuates a switch located therebetween which controls the movement of a pair of aligner plates 10, 12. As will be described in detail hereinafter, the actuation of the switch results in a jogging movement of the aligner plates to square up the sides of the bundles during the time the bundle is located on conveyor sections 4, 6. The bundle is subsequently moved into engagement with another switch that controls the operation of a bottom wrapper mechanism that directs a bottom wrapper into the path of the bundle. Further movement of the bundle brings it onto a second pair of conveyors 140, 142, wherein it engages a switch that controls the movement of a pair of chain driven pusher paddles 14, 16.

Upon reaching the end of the entry section, where the sides of the bundle have been aligned, the bundle is moved by the pusher paddles against a pair of gate assemblies 15, 17, where the leading and trailing ends of the bundle are aligned. Subsequently, the bundle is compressed and then the gates are opened and a pair of transversely spaced feeder and bundle positioning roller assemblies 20, 21 are biased into engagement with the sides of the bundle to move it into position to be tied. When the bundle is properly located in the tying mechanism, the roller assemblies are moved out of the way and bundle clamps are actuated to hold the bundle in position during tying. If the bundle is to be tied by a single wire, it is moved to where an intermediate portion is disposed within the wire tier and if it is to be tied twice, the bundle is sequentially positioned to effect this action. The wire tying mechanism is contained in housing 26 and the details thereof form no part of the instant invention. A tier that may be used is disclosed in an application filed August 30, 1963, in the name of the instant inventor and assigned to the assignee of the present invention, which application has been given Serial No. 305,670, and which application is now Patent No. 3,207,060.

After the bundle has been tied by either one or two ties, it is ejected from the machine by an exit conveyor 28.

Turning now to the specifics of the machine embodying the present invention, the first portion to be dealt with is the entrance section wherein the sides of the bundle are squared up by the transversely spaced vertically extending aligner plates 10, 12. The details of the mechanical components for jogging the plates 10, 12 are best illustrated in FIGURES 6, 7 and 8.

The entry conveyor sections 4, 6 and bristle brushes 8 are continuously driven by a drive motor 30 through sprocket 32, chain 34, sprocket 36 and shaft 38. On the shaft 38 are located sprockets 40, 42 which when rotated drive chains 44, 46 that extend over sprockets 48, 50, respectively, located on shaft 52. As shown in FIGURE 6, the conveyor rollers 54 on which the bundle is located are connected to chains 44, 46. Similarly, conveyor section 6, consisting of rollers 56 that are connected at their opposite ends to chains 58, 60, are driven by sprockets 64, 65 located on shaft 38 and sprockets 62, 66 fixed to shaft 52. The bristle brush shaft 8 is driven through gears 67, 68, 69 (see FIGURE 9).

In FIGURE 6, there are shown various mechanisms that control the movement of the aligner plates 10, 12. These mechanisms are actuated by the operation of limit switch 70 (see FIGURE 5) that starts the operation of an air cylinder 71, the movement of which effects a jogging movement of the aligner plates. The reciprocation of air cylinder 71 is effectively controlled by a pair of valves (not shown) and illustrated switches 72, 74, which are in turn controlled by actuators 76, 78, respectively. Actuators 76, 78 are alternately engaged by piston rod 80 extending from motor 71. The rod is secured at one end to a bracket 82 affixed to a slide member 84 that is connected to a vertical support plate 86 for aligner plate 12. The aligner plate 12 is fastened to support 86 by a pair of vertically spaced braces 88, 90. Attached to the slide member 84 is a rack 92 which is positioned to contact actuators 76, 78 during longitudinal movement thereof.

Briefly, when piston rod 80 is extended, the rack 92 contacts actuator 78 to position switch 74 and its associated valve to direct fluid to cylinder 71 to move piston rod 80 and plate 12 to the left, as shown in FIGURE 6. At the end of the travel of rod 80, rack 92 engages actuator 76 to effect reverse action of cylinder 71, rod 80, and plate 12. Thus, as long as switch 70 is actuated, the aligner plate 12 will be jogged to and from the sides of the bundle.

In order to effect similar oscillating movement of aligner plate 10, the rack 92 rotates a pinion 94 that is secured to a vertically extending shaft 96. The rotation of shaft 96 rotates transversely spaced pinions 98, 100, which move racks 102, 104, respectively, to the right, as shown in FIGURE 6. The racks 102, 104 are secured to transversely spaced braces 106, 108, which are affixed at their other ends to aligner plate 10.

In order to provide support for the upper end of support 86 of plate 12 and to effect oscillating movement of the upper portion of support 86, and thus plate 12, the shaft 96 has secured to its upper end a pinion 110. The pinion 110 engages a rack 112 connected to a transversely extending slide member 114, which is secured to the upper end of support 86.

As aforementioned, the bundle is continuously moved in a longitudinal direction on the conveyor sections 4, 6, during which movement it engages safety aligner switch 116. This switch is interconnected with a switch located further along the machine and functions to close against the bundle located between the aligner plates if a previous bundle has not cleared the adjacent section of the machine.

After the sides of the bundle have been aligned due to the jogging action of the aligner plates, the bundle is moved onto a pair of transversely spaced conveyor sections 140, 142 that are in longitudinal alignment with sections 4, 6, respectively. These two conveyor sections 140, 142 are also driven by motor 30 off of shaft 38 through sprocket 120, chain 122, and sprocket 124 affixed to shaft 126. Specifically, the drive for conveyor section 140 consists of transversely spaced sprockets 128, 130, chains 134, 138, and sprockets 132, 136. The rubber covered conveyor rollers 149 (see FIGURE 14) are affixed to and between chains 134, 138. The second conveyor section 142 is similar to conveyor 140 and includes sprockets 148, 150 on shaft 126 that drive chains 146, 151, which extend over sprockets 144, 152, respectively, and to which are connected a plurality of rollers 149. The sprockets 132, 136, 144, 152 are located on shaft 135 at the end of which is disposed gear 153 that drives brush shaft 156 through gears 154, 155.

Bottom wrapper mechanism

As the bundle leaves conveyor sections 4, 6, it engages a switch 156 (see FIGURE 5) which actuates a bottom wrapper mechanism disposed beneath the conveyor sections 140, 142 to dispense a bottom wrapper to where its leading edge is in position to be contacted by the oncoming bundle. The bundle engages the leading edge of the bottom wrapper and as the bundle moves along, it draws the wrapper beneath the stack of papers to serve as a covering for the bottom of the bundle. The bottom wrapper mechanism is disclosed in FIGURE 10, which illustrates the various components in position to eject and sever another bottom wrapper. The details of this unit are set out below.

The unrolled portion 157 of the roll of paper 158 from which the bottom wrapper is cut is maintained taut by a tension unit 159. Thus, when the switch 156 is actuated, a wrapper of a predetermined length will be unwrapped from the roll. The paper extends about a feed drum 166 underneath a pinch roll 168 that keeps the paper from unthreading, and upwardly through a lower wrapper guide 172 past a cutting mechanism and into the lower portion of the upper wrapper guide 173.

The movement of the paper is controlled by a cylinder 160, the operation of which is regulated by switch 156. When fluid is directed into the piston end of the cylinder 160, the cylinder rod 161 moves a rack 162 connected thereto to rotate a pinion 164 secured to the feed drum 166. Rotation of the feed drum feeds the prescribed amount of paper through the gates 172, 173 into position to be engaged by the leading end of the bundle. At the end of the travel of rack 162, an actuating pin 174 secured to cylinder rod 161 acts to engage a lever 176 that controls the movement of an overcenter device 178, the function of which is to operate the cutting mechanism to sever the bottom wrapper section from the remainder of the paper roll.

The cutter mechanism consists of a cutter guide 186 and a cutter blade 188 which move relative to each other to sever the bottom wrapper from the roll of paper. The cutter blade is resiliently mounted in place by a tension spring 192 secured to one arm of a bell crank 193, the other arm of which is connected to a pin 194 secured to the cutter. The counterclockwise movement of the actuating lever 176 by actuating pin 174 pivots lever 180 that engages pin 182 in slide 184, that supports cutter guide 186, into contact with the cutter 188, with the resulting paper severing action. As can be appreciated, the movement of lever 176 will move overcenter device 178 upwardly and move cutter guide 186 into engagement with blade 188 with a snap action. When the rack has reached the end of its travel, the switch 195 is engaged to control a valve that effects return of the cylinder 160 to its normal position. A switch 198 disposed adjacent the cylinder 160 is in series with switch 156 and insures that the rack is fully returned before another bottom wrapper is cut from the roll. This prevents the rack from moving outward from an intermediate position.

Pusher paddle assembly

As the bundle approaches the end of conveyor sections 140, 142, it engages a switch 196 that effects movement of the pusher paddles 14, 16 through one revolution into engagement with the back end of the bundle to square it up against gates 334, 336 disposed downstream of the pusher paddles. As will be described hereinafter, the movement of the bundle on the sections 140, 142 is accelerated at the time the pusher paddles are actuated so that when the paddles have been rotated one revolution, the bundle will have been moved forward of the paddles so the paddles can perform their straightening action.

The pusher paddles are driven through a complete cycle by a "one-revolution" clutch, the movement of which is controlled by a solenoid 200 actuated by switch 196. The mechanism operated by the solenoid for controlling the operation of the clutch 216 is shown in FIGURES 11 and 12. As illustrated therein, the solenoid 200 controls the movement of a rod 202 that is connected at its outer end to a lever 204. The rod and lever are biased into the illustrated position by a compression spring 206. In this position, the lever 204 restricts movement of cam 207 located on shaft 219 extending through the clutch 216. As a means for preventing damage to the clutch, there is provided a second lever 208 disposed adjacent lever 204, which lever 208 is biased outwardly by a spring 212 extending about rod 210 to control the movement of a second cam 214 similarly located on shaft 219. The operation of solenoid 200 permits shaft 219 to rotate 360°, which through mechanisms to be described will drive pusher paddles 14, 16 through a single revolution and operate the means for accelerating the movement of conveyor sections 140, 142 to effect the desired bundle movement.

Referring first to the drive mechanism for the pusher unit paddles, it is seen by referring to FIGURES 9 and 12 that the shaft 219 drives a transversely extending shaft 228 off of which the pusher paddles are driven through a sprocket 220, chain 221, and sprocket 222 secured to shaft 228. The slack in chain 221 is taken care of by roller 224 secured to lever 226' rotatably mounted on shaft 228.

The shaft 228 drives shaft 234, on which are located sprockets 236, 238, through bevel gears 230, 232. The sprockets 236, 238 and adjacent sprockets 242, 240, respectively, on shaft 243 drive chains 18b, 18a to which the pusher paddle assembly 14 is connected. At the opposite end of shaft 228 on the other side of conveyor sections 140, 142, there are located a similar pair of bevel gears 244, 245, which rotate shaft 246 to which are affixed sprockets 248, 250 and adjacent sprockets 252, 254, respectively, about which chains 19a, 19b are disposed and to which pusher paddle assembly 16 is connected.

As shown particularly in FIGURE 14, the support for the pusher paddle assembly 16 consists of a pair of vertically spaced braces 257, 258 which support suitable bushings through which shafts 256, 246 extend. The braces are in turn supported on a vertically extending bracket 259 that is connected at its upper end to a main frame member 260. In addition, there are provided tubular end spacers 261, 262 that are secured to the chains 19a, 19b for maintaining them in properly spaced relationship. A similar support structure is provided for pusher paddle assembly 14, and thus only one need be described. It remains to note that the pusher paddle assemblies 14, 16 consist of two elongated relatively movable members 270, 272 that are resiliently retained in the position shown in FIGURE 11 by torsion springs 282, 284. As shown in FIGURE 5, the movable members 270, 272 of each paddle assembly are moved closer together against the action of the torsion springs to assist in the forward movement of the bundle when the gates downstream of the paddle assemblies are opened. This action will be described in greater detail in discussing the method of operation of the machine. The paddles are strengthened by braces 274, 276 and the paddles are connected at their opposite ends to their respective chains by pins 292.

As previously mentioned, the pusher paddles function to act against the back end of the bundle to bias the bundle against a pair of gates 334, 336 to square up the leading and trailing end portions of the bundle. To accomplish this within the time it takes for the one-revolution clutch to be energized and rotate the paddles through a single cycle, the linear speed of the intermediate conveyor sections 140, 142 is increased and in the illustrated embodiment doubled when the leading end of the bundle approaches the paddle assemblies. This speed-up of the bundle movement increases the effectiveness of the bundle squaring action by the pusher paddles and gates and also gets the bundle out of the way of a succeeding bundle. Another obvious advantage of such an arrangement is the increase in the number of bundles that the machine can handle in a given period.

The mechanism for effecting this rapid movement of the intermediate conveyor section essentially consists of a cam and brake arrangement that functions to double the speed of the rubber-covered conveyor rollers 149 rotatably mounted on the chains 146, 151 and chains 134, 138. The details of this arrangement include shaft 219 and a parallel transversely extending shaft 304. The shaft 304 is rotated in synchronism with shaft 219 by sprocket 312 that is driven by chain 310 and sprocket 314 secured to shaft 219. There are secured to shafts 219, 304 a plurality of transversely spaced cams 298, 300, respectively, which control the movement of brake shoes 294, 296 located below the rollers 148 in each of the conveyor sections 140, 142. The cams act on rollers 306, 308 secured to the brake shoes. When the one-revolution clutch is actuated, the shaft 219 similarly rotates and drives shaft 304 to rotate cams 298, 300 to move rollers 306, 308 and brake shoes upwardly into engagement with the lower portion of the rubber rollers 149 to double the linear speed of the bundle located thereon. At the end of the one revolution, the switch 197 in series with switch 196 is positioned by plate 316 secured to the brake when the rollers drop into the cam notches 298a, 300a to drop the shoes to accommodate a succeeding bundle. If the paddle assemblies are not moved through a complete cycle, the switch 197 will not be properly positioned to permit subsequent actuation of switch 196. This arrangement serves as a safety for the paddle assemblies.

*Gate control apparatus and bundle positioning roller assembly*

When the bundle is moved against gates 334, 336, it engages a switch 318 (see FIGURE 5) which operates a compressor cylinder 322 (see FIGURE 15). Extending from the cylinder 322 is a rod 330 that is connected to a compressor pad 320 that engages the front portion of the top of the bundle to expel the air from between the layers of paper. Secured to the sides of pad 320 are rods 326, 328 that extend upwardly through bushings 322, 324, respectively. This reduces the height of the leading edge of the stack of newspapers and makes for a tighter bundle. In addition, this slopes the leading edge of the bundle in a downward direction, which due to the action of the air against the downwardly sloped bundle aids in the retention of the bundle in a compact condition when the bundle is moved forward. If this downward slope was not formed, it is possible that the upper layers of the bundle would be moved upward by the air encountered during the bundle's forward movement. The compressor pad 320 is subsequently raised through the action of suitable control means, at which time a cylinder 338 is actuated to open the gates 334, 336. At the same time the gates are opened, a pair of transversely spaced positioning rollers 376, 378 are moved into engagement with the sides of the bundle to move it through the gates and forward to a station to where it is to be tied (see FIGURES 15 and 16). The mechanical interrelationship between the gates and the bundle positioning rollers and the drive for the positioning rollers to effect a predetermined movement of the bundle is described below.

Referring first to FIGURES 16, 17 and 18, there is illustrated the mechanism for effecting opening and closing of the gates, and movement of the positioning rollers 376, 378 disposed on the near side of the gates. When the gates are opened, the bundle positioning rollers 376, 378 are moved into engagement with the sides of the bundle and conversely, when the gates are closed, the rollers are moved outwardly of the conveyor. When the piston in cylinder 338 is moved to the right in FIGURE 16, the gate 336 is moved to the open position by piston rod 340 through various racks and gears, including rack 344. The rack 344 engages pinion 346 on shaft 348 to which are also secured axially spaced pinions 352, 354 that are in operative engagement with racks 356, 358 fixed to gate 336 to effect movement thereof at the appropriate time. It is to be noted that when the gate 336 is opened, gear 352 on shaft 348 effects counterclockwise movement of gear segment 386 and associated bundle positioning roller 378. The details of this arrangement will be dealt with at length hereinafter.

The gate 334 is moved to the open position simultaneously with gate 336 through the movement of rack 360 secured to piston rod 342 extending from cylinder 338. The rack 360 rotates idler 362 to drive pinion 364 secured to shaft 366 that in turn supports pinions 368, 370. The pinions 368, 370 engage racks 372, 374 connected to gate 334 to effect opening and closing thereof as called for by the operation of cylinder 338. As discussed with respect to gate 336, the movement of gate 334 effects movement of its associated bundle positioning roller 376 into engagement with the forward side portion of the bundle when the gate 344 is opened through the rotation of pinion 368 on shaft 366 through gear segment 384 connected to roller 376.

When the gates are opened, the rubber covered bundle positioning rollers 376, 378 are moved into frictional engagement with the sides of the bundle to move the bundle forward an amount determined by the rotation of these rollers and a plurality of longitudinally spaced positively driven vertically aligned rollers located adjacent to and forward of rollers 376, 378 on both sides of the path of travel of the bundle (see FIGURE 19).

In FIGURE 19, there is illustrated the bundle positioning roller assembly 381 extending along one side of the conveyor. It is to be noted that the roller 376 is shown spaced a substantial distance from an adjacent drive roller, but this is due to the way the section was taken.

Generally speaking, the roller assembly 381 is supported by a frame structure 379 from which the rollers making up the roller assembly are supported. As described in detail below, the rollers are driven from a single drive shaft 398 by suitably positioned gears.

Referring first to the roller 376 which is moved in position to initially engage the bundle when the gates are opened, it is seen that this rubber-covered roller is secured to a shaft 390 to which is affixed a pinion 392 that is driven by drive shaft 398 through gears 402, 404, 406, 408, 410, 412 and 414.

The roller 376 is rotatably supported on a subframe 380 which is in turn pivotally mounted relative to shaft 382 supported by frame 379. The shaft 382 extends downwardly, and disposed adjacent to the end thereof are a pair of bearings 383, 385 about which the subframe 380 pivots. The subframe 380 is thus free to pivot to move roller 376 into engagement with the adjacent side of the bundle when the gate 336 is opened in response to movement of sector gear 386, which as previously mentioned is driven by pinion 352 located on shaft 348.

The remaining rollers 414, 416, 418, 420 and 422 are similarly driven from drive shaft 398, through pinion 423 secured to shaft 398 and gears 424, 426, 427, 428, 430, 432, 434, 436, 438, and 440. Also secured to shaft 398 is a rubber covered roller 399.

The shaft 398 is driven from shaft 442 through interengaging bevel gears 394, 396. The shaft 442 drives the transversely spaced bundle positioning roller assembly 443 in the manner disclosed in detail in FIGURE 20. As therein illustrated, the shaft 442 is coupled to a horizontally extending roller 444, the other end of which is connected to a stub shaft 446. Secured to the other end of shaft 446 is a bevel gear 448 that drives bevel gear 450 fixed to shaft 452, which is the counterpart of shaft 398. Connected to shaft 452 is rubber covered roller 454 that corresponds to transversely spaced roller 399. The shaft 452 drives gear 456, the movement of which drives the gears and rollers of bundle positioning roller assembly 443 corresponding to gears 424–440 and rollers 414–422 of transversely spaced bundle positioning roller assembly 381. Axially spaced from gear 456 on shaft 452 is a gear 458 that is connected to roller 378 in a manner corresponding to the driving connection for roller 376.

Turning now to FIGURE 21, there is illustrated the drive mechanism for driving the bundle positioning roller assemblies 381, 443. The main drive system includes a feeder motor 460, which, through the action of chain 462, shaft 463 and a gear reduction system 466, drives shaft 464. Secured to shaft 464 and driven thereby is a chain 468 which drives a commutator 470, which sets into motion a shaft 471 (see FIGURE 5), on which a series of cams are located. The cams, the details of which are not important to an understanding of the present invention, control the movement of the various cylinders which effect operation of the bundle positioning assemblies, bundle clamping gates, tying mechanism, feeder motor shut-off, and feeder reset mechanism in the desired sequence.

There are located on the shaft 464 a pair of cams 472, 473 that control the movement of the bundle positioning rollers and thus the bundles. Depending on which cam is placed in operative position, the bundle will be moved to a position where a single strand of wire is disposed around the center of the bundle and secured relative thereto, or the bundle will be moved to a first position where it will be tied, and then to a second position, where a second strand will be disposed about the bundle. A switch 475 (FIGURE 5) located adjacent the cams 472, 473 functions to set up the circuitry for effecting single or double-tie operation.

The cam 472 is a "single-tie" cam which effects movement of the bundle positioning rollers to locate the bundle at a station where a single tie will be performed and cam 473 is a "double-tie" cam, the operation of which will rotate the bundle positioning assemblies in two stages to properly position the bundle so it will be tied twice. The cams are moved into and out of operational engagement by a handle 474 secured to the end of a rocker arm 476 that positions a yoke 478 which is operative to move the cams axially of shaft 464. In the position shown in FIGURE 21, the single-tie cam 472 is in the operative position to effect a predetermined movement of bundle positioning rollers in the following manner.

The cam 472 is designed to effect a predetermined clockwise movement of lever 482 through engagement with a cam follower 480 secured to lever 482. The lower end of lever 482 is connected to a plate 484 and the upper end of lever 482 is connected to a pivotally mounted bracket 486 that is secured to the end of the rack 488. The rack 488 and associated lever 482 are biased into the position shown in FIGURE 21 by a spring 490.

The rack 488 engages a pinion 492 that is connected to an overrunning clutch 494. The output shaft of the clutch drives shaft 498 through gear box assembly 495 and servo brake 496. The shaft 498 is in turn connected to shaft 442 through gears 500, 502. The outer end of shaft 498 has secured thereto a gear 504 that drives gear 506 to move belt 508, which carries the tied bundle from the machine.

As can be appreciated, the bundle must be moved a precise amount, and to this end, provision must be made to prevent overtravel of the bundle after the bundle positioning rollers have been stopped. The overtravel could result from the momentum generated in the bundle due to its forward travel. Also, means are provided to dynamically brake the feed motor when it is cut out of the system.

The bundle is prevented from moving beyond the position to which it was moved by the bundle positioning rollers by a servo brake 496 disclosed in detail in FIGURES 22–24. The brake functions to halt the rotation of the bundle positioning rollers as soon as rack 488 has reached the end of its travel due to the operation of the cam 472 by feeder motor 460. When the rack 488 has reached the end of its travel, the overrunning of shaft 498 due to the momentum imposed on the rollers by the bundles moving therebetween initially results in the continued rotation of shaft 498 relative to pinion 492, which is permitted by free running clutch 494. This continued rotation drives hub 510 and gear 512 secured thereto by pin 514 to rotate plate 520 pivoted about pin 522 in a clockwise direction, as shown in FIGURE 22. The clockwise movement of plate 520 moves brake shoe 518 into engagement with the inner surface of sleeve 519. At the same time, gear 512, which is in engagement with segment gear 524 that is connected by pin 526 to plate 527 functions to move brake shoe 530 into engagement with sleeve 519 to aid in stopping the overrunning of the bundle positioning rollers. It is to be noted that the plate 527 is pivoted about pin 532 and the upper end of plate 527 is pinned to brake shoe 530.

Furthermore, it can be seen from the drawings that the guide plate 534 keyed to input shaft 497 is formed with a slot 536 in which a pin 538 connected to brake shoe 530 is located. This assembly limits the inward movement of brake shoe 530. The plates 520, 527 are resiliently biased out of engagement with each other by a spring 540.

When the bundle is moved forward by the bundle positioning roller assemblies, the front end is moved against transversely spaced stop gates to prevent the top papers from spilling over. When the bundle is to be tied with a single strand, the gates 541 are moved in front of the bundle. These gates are spaced from the ring gear 400 of the wire tier 401 by an amount equal to one-half the length of the bundle. If the bundle is to be double-tied, the gates 543 are moved in front of the bundle. These gates are spaced from the ring gear approximately one-third the length of the bundle.

After the bundle has been moved through the ring gear 400 of the wire tier 401, by the bundle positioning roller assemblies, the roller assemblies are moved out of engagement with the sides of the bundle. Th mechanism for effecting this movement is controlled by the commutator and associated cams heretofore briefly described. The mechanisms for positioning each of the groups of rollers are identical and only one will be described in detail.

While the bundle is in position to be tied, a cylinder 542, connected to the left-hand roller assembly 381, as shown in FIGURE 16, by a rod 544 is actuated to withdraw the rollers from the bundle. When the bundle positioning roller assemblies are retracted, a pair of transversely spaced bundle clamps 550, 552 are moved into position to hold the bundle in place during the wire tying operation. As shown in FIGURE 16, the bundle clamps 550, 552 are located immediately adjacent the center line of the path of the wire which is directed around the bundle by a wire tying machine 401 of the type disclosed in Parker Patents Nos. 1,875,259 and 1,875,260. The mechanical interconnection between the rod 544 and the cylinder 542, and the bundle clamps is best shown in FIGURES 16 and 25–27.

As set forth in these figures, the rod 544 is interconnected with a rack 548 by a yoke 546. The teeth of the rack 548 engage a plurality of teeth 556 on a mutilated gear segment 557, and the lower portion of segment 557 defines teeth 558 that are in engagement with the teeth of rack 560. The rack is secured to rod 561 and the outer end thereof is connected to the side clamp. Thus, it can be seen that retraction of rod 544 effects extension of rack 560 and corresponding clamping movement of side clamps 550, 552.

It remains to note that the upper clamp portion 566 of the bundle clamps is vertically positioned by a cylinder 568 that is actuated along with cylinder 542 to effect clamping of the bundle on the three sides thereof. Switch 570 is provided to turn the wire tier off and switch 571 may be employed to reset the wire tier. In addition, the ring gear is dynamically braked to prevent overtravel thereof.

The method of operation of the machine is as follows:

A number of newspapers taken from a printing press are stacked in a bundle and placed at the entrance of the machine. A top wrapper may or may not be provided, as desired. The positively driven axially spaced row of bristle brushes 8 prevents the bottom papers from going under the conveyors 4, 6 and serves to assist in directing the bundle onto the entry section thereof. When on the conveyors, the bundle engages a switch 70 that sets into motion the aligner plates 10, 12. These plates oscillate in and out against the sides of the bundle to align the edges of the newspapers in said bundle.

The conveyor sections are positively driven and thus the bundle moves longitudinally through the machine and subsequently engages a switch 116. The switch 116 functions to move the aligner plates 10, 12 into holding engagement with the bundle in the event there is a bundle located immediately downstream thereof. When the preceding bundle has cleared the subsequent conveyor section, the aligner plates will move out of their holding position and the conveyor sections 4, 6 will again effect longitudinal movement of the bundle into engagement with switch 156. Switch 156 starts the operation of the bottom wrapper mechanism to cut a predetermined length of paper from a roll disposed beneath the conveyors and direct the leading edge of the severed sheet slightly above the conveyor, where it will be engaged by the leading edge of the bundle. Subsequent movement of the bundle results in the bundle positioning the severed sheet of paper beneath the stack of papers.

Further movement of the bundle brings the bundle into engagement with switch 196 that operates a single revolution clutch that moves a pair of transversely spaced paddle assemblies 14, 16 into engagement with the back end of the stack of papers and at the same time actuates a pair of transversely extending shafts 219, 304 on which are located a plurality of cams 298, 300. The cams move a pair of brake shoes 294, 296 into engagement with the rollers on the transversely spaced conveyor sections 140, 142 to double the speed of movement of the bundle to move the bundle against a pair of transversely spaced gates 334, 336. The movement of the conveyor sections 140, 142, in conjunction with the operation of the paddle assemblies 14, 16, results in the squaring up of the leading and trailing edges of the newspapers in the bundle.

As the bundle reaches the gates, it engages a switch 318 that actuates a pair of overhead cylinders that are connected to a compressor pad 320 to compress the leading edge of the bundle by forcing the air out between the adjacent newspapers. When the compressing action is completed, a switch is operated which effects opening of the gates 334, 336 to permit the bundle to be moved into position to be tied by the wire tier. The opening of the gates effects movement of a pair of rollers 376, 378 through a mechanical interlock arrangement whereby the rollers are moved into engagement with the sides of the bundle on the near side of the gates through a pair of gear and rack assemblies. When the gate 336 opens, it engages a feeder motor start switch 375 that starts the drive motor 460 for the bundle positioning rollers to effect a predetermined rotation of said rollers. At the same time, the roller assemblies 20, 21 located upstream of the gates 334, 336, move into engagement with the sides of the bundle to continue the movement of the bundle begun by the rotation of the rollers 376, 378. The resiliently compressed paddle assemblies prevent top papers from staying behind when the bundle is moved forward. Also, the downward slope of the leading end of the bundle results in the bundle remaining compressed during its forward motion.

The rotation of the rollers in the bundle positioning assemblies is controlled by the feed motor 460 through a cam to effect a predetermined rotation of said rollers. The rotation of the rollers and thus the movement of the bundles depends on whether the bundle is to be tied with one or two strands of wire. This determination is made by moving either a single-tie cam or a double-tie cam into engagement with the cam follower 480. The rollers are rotated a predetermined amount due to the shape of the cam and associated movement of the gear mechanism operated by said cam to move the bundle against a pair of stop gates 541 that prevent the papers from spilling off the top of the bundle. The servo brake 496 prevents overtravel of the rollers to effect a positive predetermined longitudinal movement of the bundle.

The roller assemblies 20, 21 are then moved out of engagement with the sides of the bundle by the operation of cylinders 542 and simultaneously therewith through a mechanical interlock arrangement the bundle clamps 550, 552 disposed adjacent the wire tier are moved into engagement with the bundle to retain the bundle in position during the wire tying operation. At the same time, an upper clamp 566 is moved downwardly against the top of the bundle to retain the papers against upward movement. The wire tier 401 is then set into motion to dispose a strand of wire about the bundle and tie same in position. The bundle will remain clamped in position until a subsequent bundle come along, at which time the stop gates are opened and the clamps are moved out of engagement with the bundle, and the bundle is moved by conveyor 508 onto a subsequent conveyor, if desired. The conveyor 508 is operated by the feed motor and is moved along with the bundle positioning rollers.

In the event it is desired that the bundle be tied with a pair of longitudinally spaced wires, the machine is set up so that a "double-tie" cam is positioned to control the movement of the bundle positioning rollers. When the double-tie cam is in place, the bundle positioning rollers will move the bundles against stop gates 543 where the bundle is tied and then immediately thereafter will be reactuated to move the bundle to a second position for tying a second strand of wire about the bundle. This operation will be effected through suitable control of the feed motor and servo brake, which is determined by the switch 475.

Thus, it can be seen that there is provided a fully automatic machine that will take a stack of newspapers, or the like, and square them up into a substantially uniform bundle, provide a bottom wrapper to the bundle, and properly position the bundle so that it can be securely tied. The speed at which this machine can operate enables it to be very adaptable for high-speed operation, wherein it is desired to tie a large number of bundles in the shortest possible time.

There are, of course, obvious substitutions which can be made for the various components of the apparatus and such modifications are clearly within the scope of the present invention. For example, the particular switching mechanisms, gearing mechanisms, and other control devices that have been employed are merely exemplary and are not intended to be limiting. Also, the bottom wrapper mechanism can be eliminated, if desired. Other arrangements will obviously occur to one skilled in the art, and it is not intended to cover by this invention only that embodiment illustrated herein.

I claim:

1. Apparatus for tying a stack of materials into a bundle including conveying means for moving the material to be bundled through a series of stations, side aligning means for squaring up the sides of the bundle, means for directing a wrapper beneath the stack, end aligning means for squaring up the ends of the stack, compressing means for compacting the stack, means for moving the stack into position to be clamped, means for clamping the stack, and means for directing and tying a ligature about the stack.

2. Apparatus for tying a stack of articles into a bundle including conveying means for moving the stack to be bundled sequentially through a series of stations, means at a first station for aligning the sides of the stack, means at a second station for directing a sheet of material beneath the stack, means responsive to movement of said stack to actuate said directing means, means at a third station for aligning the ends of the stack, means adjacent said third station for compacting the stack, means for clamping the stack, and means for directing and knotting a ligature about the stack to tie the stack of articles together.

3. A machine for tying a stack of papers into a tight compact bundle including a conveying means for moving the stack to be tied through a series of stations where a plurality of separate operations are performed on the stack comprising oscillating side plates for aligning the sides of the stack, synchronized pusher plates and gate means for aligning the ends of the stack, means for compacting the forward end of the stack for eliminating the air trapped therein, means for moving the stack into position to be secured in place during the tying operation, and means for directing a ligature about the stack and knotting same to retain the ligature in position and thereby form a tight bundle.

4. A bundle tying machine including a conveyor, means for driving the conveyor, a pair of side plates disposed adjacent the entrance end of the conveyor, means for oscillating the plates into and out of engagement with the sides of the stack of articles to be bundled to align the sides thereof on the conveyor, a transversely movable gate adapted to be moved into position in front of the stack, pusher means adapted to engage the rear end of the stack and push it against the gate to align the front and rear ends thereof, stop means, means for opening the gate and for moving the stack against said stop means, means for clamping the stack in position adjacent said stop means, and means for tying a ligature about said stack to form it into a tight package.

5. A machine for aligning a stack of articles into a neat row and for tying same into a bundle including a conveyor assembly, drive means for said conveyor assembly, a pair of side plates disposed adjacent the entrance to the conveyor assembly for aligning the sides of the stack of articles disposed thereon, means for oscillating the plates into and out of engagement with the sides of the article stack, pusher means disposed adjacent the sides of the conveyor, a gate transversely movable relative to said conveyor, means for operating the pusher means and gate whereby the pusher means engages the rear end of the article stack and pushes it against the gate to align the front and rear ends of the stack, stop means, means for opening the gate and for moving the stack against said stop means, means for clamping the stack in position adjacent said stop means, and means for tying a ligature about said stack to form a tight bundle.

6. A machine for aligning a stack of articles into a neat row and for tying same into a bundle including a conveyor assembly, drive means for said conveyor assembly, a pair of side plates disposed adjacent the entrance to the conveyor assembly for aligning the sides of the stack of articles disposed thereon, means for oscillating the plates into and out of engagement with the sides of the article stack, switch means responsive to the movement of said stack for controlling the operation of said side plates, means for supplying a bottom wrapper to said stack, means responsive to the movement of said stack for controlling the operation of said bottom wrapper means, pusher means comprising vertically disposed, resiliently mounted pusher plates disposed adjacent the sides of the conveyor, a gate transversely movable relative to said conveyor, means for operating the pusher means and gate whereby the pusher means are positioned to engage the rear end of the article stack and push it against the gate to align the front and rear ends of the stack, means for compressing said stack to remove the air trapped therein, stop means, means for opening the gate and for moving the stack against said stop means, means for clamping the stack in position adjacent said stop means, and means for tying a ligature about said stack to form a tight bundle.

7. A bundle tying machine comprising a longitudinally extending conveyor adapted to receive a stack of articles thereon to be tied into a bundle, side aligning means disposed adjacent the entrance end of said conveyor for aligning the sides of the stack, means for aligning the front and rear ends of the stack, means positioned to engage the forward end of the stack to compact same by displacing the air between adjacent articles, side engaging roller means adapted to engage the sides of the stack after they have been squared up to move the stack into position to be clamped and tied, means for clamping the stack, means for directing a wire about said stack and knotting same to form a tied bundle, and means for releasing said clamping means and removing the bundle from said conveyor.

8. A bundle tying machine comprising a longitudinally extending conveyor adapted to receive a stack of articles thereon to be tied into a bundle, side aligning means disposed adjacent the entrance end of said conveyor for aligning the sides of the stack, means for aligning the front and rear ends of the stack including a pair of transversely spaced pusher plate assemblies adapted to engage the rear end of the stack and a gate assembly against which the stack is biased by said plate assemblies, means positioned to engage the forward end of the stack to compact same by displacing the air between adjacent layers thereof, side engaging positively driven roller means for moving the stack into position to be clamped and tied, means for opening said gate assembly and moving said rollers into engagement with the stack, means for clamping said stack, means for directing a wire about said stack and knotting same to form a tied bundle, and means for releasing said clamping means and removing the bundle from said conveyor.

9. A bundle tying machine as set forth in claim 8 including means for driving the roller means a predetermined amount and means for stopping said roller means after said predetermined movement, and means for synchronizing the transverse movement of said roller means and clamping means whereby said clamping means will clamp the stack in position when said roller means are moved out of engagement with the sides of said stack.

10. A bundle tying machine comprising a power driven conveyor assembly made up of a plurality of sections, transversely spaced side aligning plates disposed adjacent a first section of said conveyor, means for oscillating said plates into and out of engagement with the sides of a stack of articles disposed on said conveyor to align same, means responsive to the movement of said stack to provide a bottom wrapper for said stack during forward movement thereof, means for increasing the speed of a second section of the conveyor, means for aligning the ends of the stack on said second section of the conveyor including a pair of transversely spaced pusher assemblies operated to contact the rear end of the stack and gate means against which the stack is directed by said second section of the conveyor and pusher means, roller means positioned to engage the sides of the stack for moving the stack to a subsequent station where it is to be tied, means for limiting the forward movement of said stack, means for clamping said stack in position to be tied, means interconnecting the clamping and roller means whereby the stack is clamped in position in conjunction with the removal of the roller means from the sides of the stack, and means for tying the stack to form a tight bundle.

11. A bundle tying machine comprising a power driven conveyor assembly consisting of a plurality of sections, transversely spaced side aligning plates disposed adjacent a first section of the conveyor for squaring up the sides of the stack of articles to be formed into a bundle, means for oscillating said plates, switch means responsive to movement of said stack of articles for controlling the operation of said oscillating means, means for increasing the speed of a second section of the conveyor including brake means, means for aligning the ends of the stack including a pair of transversely spaced pusher assemblies operated to contact the rear end of the stack and gate means located adjacent the far end of the second section of the conveyor against which the stack is directed by the pusher means, means for compacting the forward end of the bundle adjacent said gate means, vertically disposed side engaging rollers positioned adjacent said gate means for engaging the sides of the stack to move the stack to a tying station, means for limiting the forward movement of said stack, means for clamping the stack in position to be tied, means for tying the stack to form a tied bundle and means for releasing the bundle and ejecting the bundle from the conveyor.

12. A bundle tying machine comprising a power driven conveyor assembly consisting of a plurality of sections, transversely spaced side aligning plates disposed adjacent a first section of the conveyor for squaring up the sides of the stack of articles to be formed into a bundle, means for oscillating said plates, means for increasing the speed of a second section of the conveyor including brake means, means for aligning the ends of the stack including a pair of transversely spaced pusher assemblies operated to contact the rear end of the stack, said pusher assemblies each including a pair of pivotally mounted spring biased outwardly vertically extending plates, means for controlling the movement of said brake means and pusher assemblies for coordinating the movements thereof to effect the required movement of said stack of articles, and gate means located adjacent the end of the second section of the conveyor against which the stack is directed by the pusher assemblies, means for compacting the forward end of the bundle adjacent said gate means, vertically disposed side engaging rollers positioned adjacent said gate means for engaging the sides of the stack to move the stack to a tying station, means for clamping the stack in position to be tied, and means for tying the stack to form a tied bundle.

13. Apparatus for aligning the ends of a stack of articles located on a moving conveyor section comprising a pair of pusher assemblies, said pusher assemblies being transversely spaced relative to the conveyor and each including a pair of vertically disposed, pivotally mounted plates, spring means resiliently biasing said plates in spaced relation, means supporting said pusher assemblies, and conveying means for moving said assemblies relative to said support means, gate means located adjacent one end of the conveyor section and means for closing said gate means and for actuating the conveying means for the pusher assemblies to direct the stack against the gate to square up the ends thereof.

14. Apparatus for aligning the ends of a stack of articles located on a conveyor section, said conveyor including a plurality of rollers, means for driving said rollers, means for increasing the speed of said rollers, a pair of vertically disposed pusher assemblies transversely spaced relative to the conveyor, means for simultaneously increasing the speed of said rollers and for driving the pusher assemblies through one cycle, gate means located adjacent one end of the conveyor section, means for controlling the movement of said gate means and means for closing the gate means and for actuating said pusher assemblies whereby a stack of articles located on said conveyor is contacted at its rear end by said paddle assemblies and is pushed up against the gate means to square the ends thereof.

15. Apparatus for handling a stack of articles located on a conveyor section, means for driving said conveyor section, a pair of vertically disposed pusher paddle assemblies transversely spaced relative to the conveyor, gate means located adjacent one end of the conveyor section, vertically movable plate means disposed adjacent the gate means for compressing the forward end of the stack of articles for removing the air contained therein, means for controlling the movement of said gate means for closing said gate means and for actuating said pusher paddle assemblies to bias the stack against said gate means to align the ends of the stack of articles located on said conveyor and for positioning said compressing means to compact the stack of articles.

16. Apparatus for tying a stack of articles into a bundle including a conveyor section for moving the stack of articles into position to be tied, stop means, means disposed adjacent the conveyor section for gripping the sides of the stack and moving it against said stop means, means for clamping the stack in position adjacent said stop means, means for synchronizing the movement of said gripping means and clamping means whereby when the clamping means are engaged the gripping means are moved out of engagement with the stack, means for directing a strap about the stack and tying same, means for releasing the clamping means, and means for ejecting the bundle from the conveyor section.

17. Apparatus for tying a stack of articles into a bundle including a conveyor section for moving the stack of articles into position to be tied, vertically disposed rollers located adjacent the conveyor section for gripping the sides of the stack, a gate, means for rotating said rollers to move the stack against said gate, means for clamping the stack in position adjacent said gate, means for synchronizing the movement of said roller means and clamping means whereby when the stack is clamped, the roller means are out of engagement with the stack, means for directing a strap about the stack and tying same, means for releasing the clamping means, and means for ejecting the bundle from the conveyor section.

References Cited by the Examiner
UNITED STATES PATENTS

| | | | |
|---|---|---|---|
| 856,803 | 6/1907 | Phillips | 100—264 X |
| 1,522,194 | 1/1925 | Labombarde. | |
| 2,128,316 | 8/1938 | Paul | 214—6 |
| 2,137,478 | 11/1938 | Delany | 214—6 |
| 2,417,643 | 3/1947 | Gneuhs. | |
| 2,636,654 | 4/1953 | Sykes | 93—93 X |
| 2,662,468 | 12/1953 | Shenigo. | |
| 2,684,626 | 7/1954 | Eberle. | |
| 2,937,485 | 5/1960 | Wall | 214—6 |
| 2,959,273 | 11/1960 | Sykes | 198—183 |
| 2,982,063 | 5/1961 | Coleman et al. | |
| 3,083,014 | 3/1963 | Howdle et al. | 271—89 |

WALTER A. SCHEEL, *Primary Examiner.*

BILLY J. WILHITE, *Examiner.*